United States Patent [19]
Nobusawa

[11] 3,945,732
[45] Mar. 23, 1976

[54] LIGHT-MEASURING SYSTEMS

[75] Inventor: Tsukumo Nobusawa, Tokyo, Japan

[73] Assignee: Asahi Kogaku Kogyo Kabushiki Kaisha, Japan

[22] Filed: Mar. 29, 1974

[21] Appl. No.: 456,380

[30] Foreign Application Priority Data
Mar. 30, 1973 Japan.............................. 48-35830
Mar. 30, 1973 Japan.............................. 48-35831
Apr. 9, 1973 Japan.............................. 48-39590

[52] U.S. Cl. ................. 356/222; 356/226; 354/31
[51] Int. Cl.² .................... G01J 1/42; G03B 7/08
[58] Field of Search ............... 356/226, 222; 328/2; 307/311; 250/209; 354/31

[56] References Cited
UNITED STATES PATENTS
3,651,744  3/1972  Okada................................. 356/226
3,652,168  3/1972  Yangi et al. ........................ 356/226
3,772,517  11/1973  Smith................................. 356/226

Primary Examiner—Alfred E. Smith
Assistant Examiner—Conrad J. Clark
Attorney, Agent, or Firm—Steinberg & Blake

[57] ABSTRACT

A light-responsive system which includes a plurality of photosensitive elements respectively directed to different parts of a scene for respectively providing electrical inputs according to the brightness of the light at the different parts of the scene. The several inputs are supplied to a plurality of electrical circuits which in turn are connected with an output unit, these circuits operating in such a way that the output unit will be actuated only by that one of the inputs which corresponds to that part of the scene which has the maximum brightness or the minimum brightness. In this way it is possible to provide an output corresponding either to the maximum brightness of the scene or the minimum brightness of the scene without requiring scanning of the scene.

18 Claims, 30 Drawing Figures

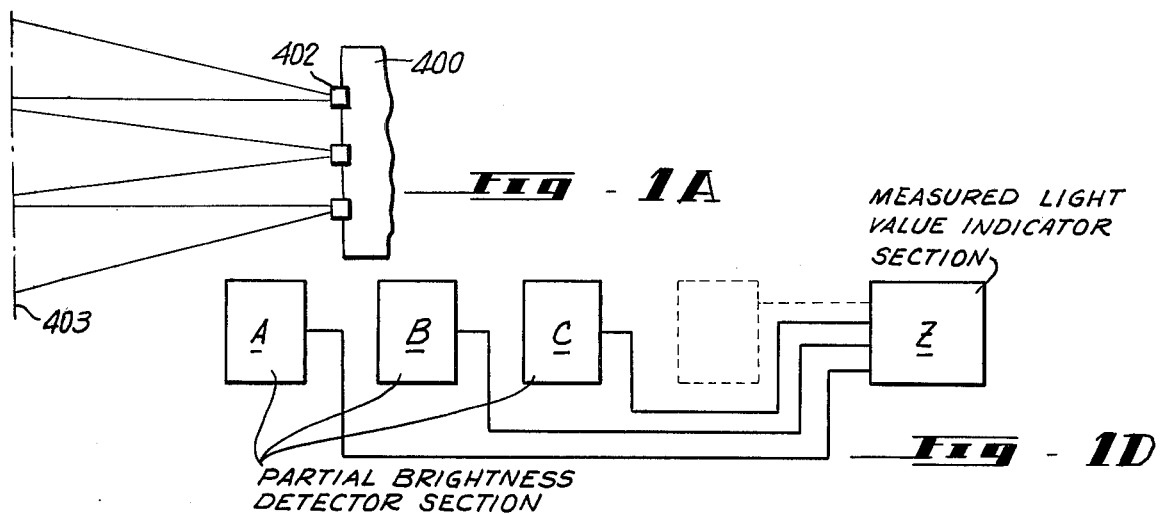
Fig - 1A
Fig - 1D
MEASURED LIGHT VALUE INDICATOR SECTION
PARTIAL BRIGHTNESS DETECTOR SECTION
Fig - 2
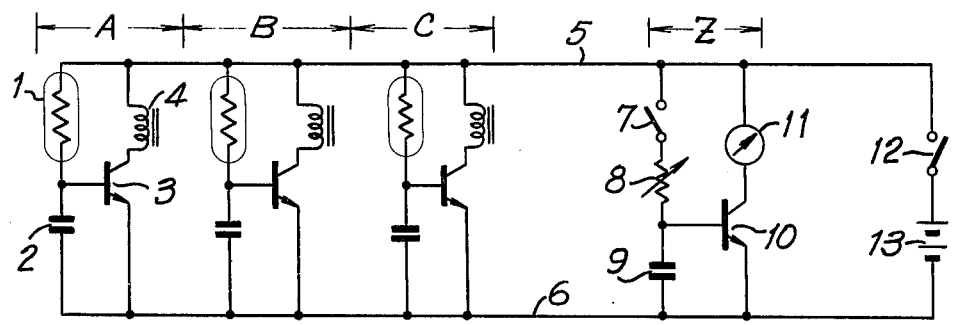
Fig - 3
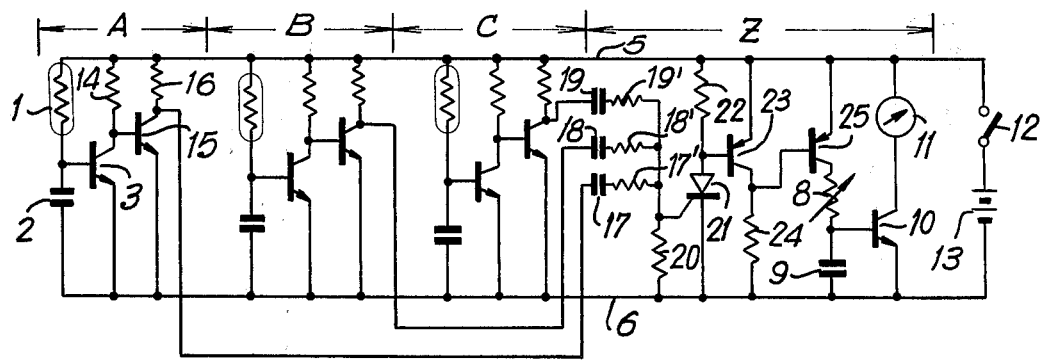
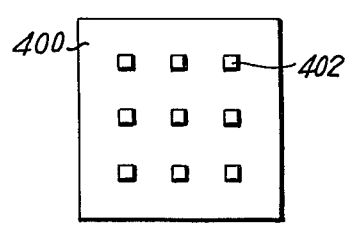
Fig - 1B
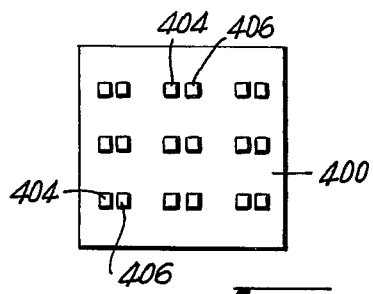
Fig - 1C

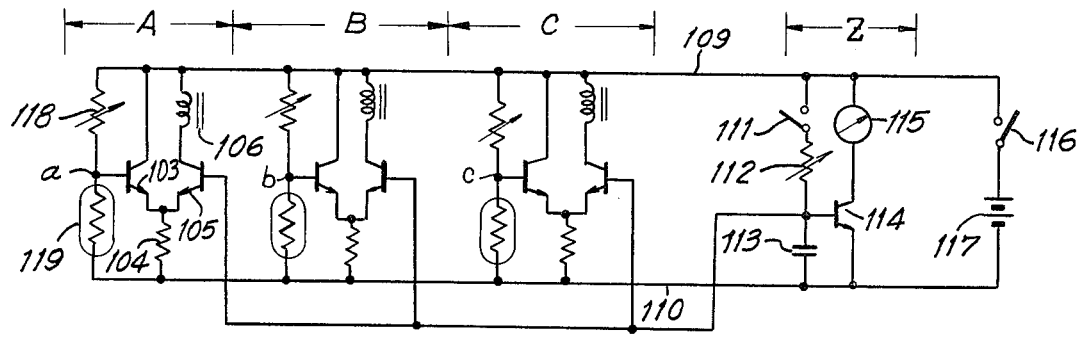
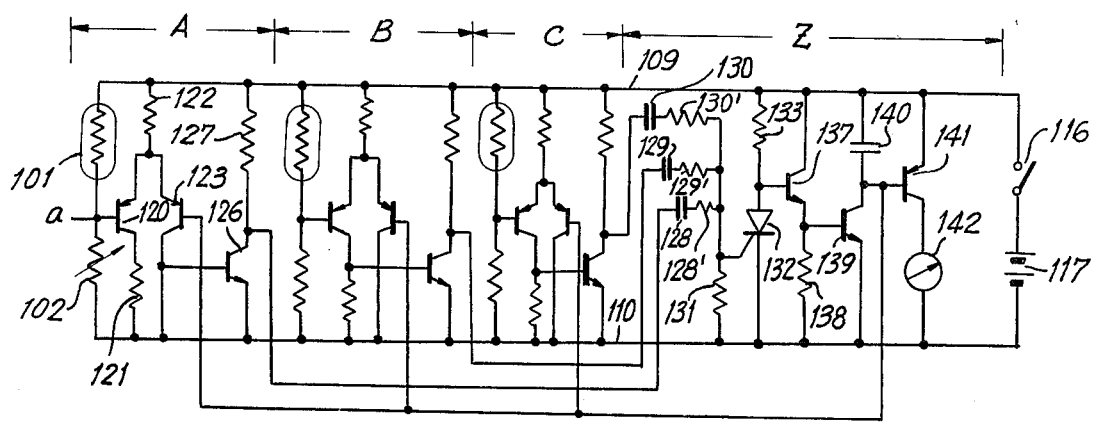
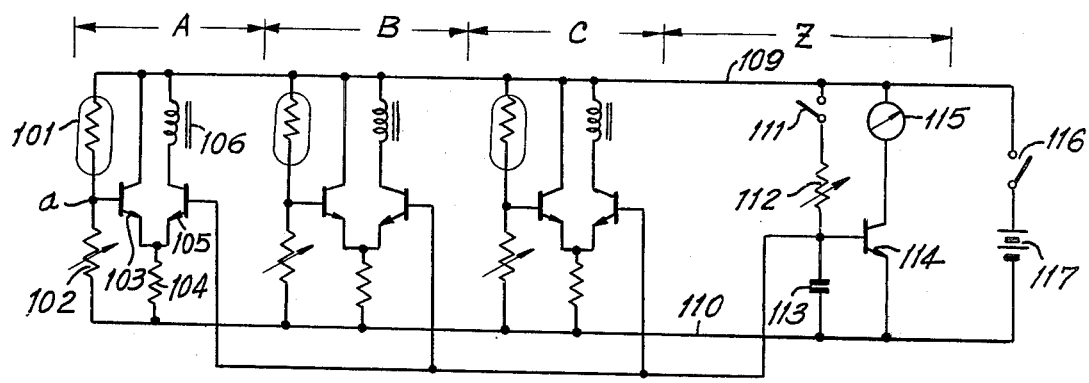

LIGHT-MEASURING SYSTEMS

BACKGROUND OF THE INVENTION

The present invention relates to light-measuring systems.

In particular, the present invention relates to systems of this type which are adapted to respond to the brightness of a given scene in order to achieve a given output corresponding to this brightness.

The features of the present invention are particularly adapted for use in photography. In connection with photography it is known that the film which is used is to be exposed to an object which is to be photographed within a particular density curve of the film taking into consideration the range of brightness of the object to be photographed, so as to achieve in this way a good tone in the photographic reproduction. Up to the present time, however, there has been no satisfactory light-measuring device which takes such a density curve into consideration. The reason for this is that such light measurement is difficult to provide and in addition certain photographers who are seriously concerned with light measuring of this type utilize conventional electrical exposure meters for partial measurement of the light of the object to be photographed so as to obtain in this way a photograph taking into consideration the density curve of the film and the brightness at the object to be photographed.

Conventional electrical exposure meters of this type have been developed from those employing selenium cells. These exposure meters have a wide viewing angle where the meter is exposed to the light at the object which is to be photographed. On the other hand, there are meters employing cadmium sulfide resistors which are exposed to light with a relatively narrow viewing angle. There has been a recent movement in the photographic industry to utilize so-called spot exposure meters particularly adapted for partial light measurement, and the result has been a rapid progress in light-measuring techniques.

While certain advances have indeed been made with measurement of light utilizing spot exposure meters with a narrow viewing angle, these types of devices have the disadvantage of requiring inconvenient manual operations as well as visual scanning through a viewfinder over the entire scene which is to be photographed, with the different parts of the scene being successively scanned so that light measurement is made of the different parts of the scene. Up to the present time there is no camera which utilizes a spot exposure meter of this type in such a way that such a meter is incorporated into the camera because of the inconveniences which would result in view of the fact that such a camera would require the operator to swing the camera over the scene in order to scan the scene which is to be photographed for the regions thereof which are of maximum and minimum brightness.

SUMMARY OF THE INVENTION

It is accordingly a primary object of the present invention to provide a light-measuring system which will avoid the above drawbacks.

More particularly, it is an object of the present invention to provide a light-measuring system which operates according to the spot exposure principle as referred to above but which at the same time can conveniently provide the desired results without necessitating a manual scanning of the scene, so that in this way either exposure meter provided with the structure of the invention can remain in a static position while evaluating different areas of the entire scene or if the light-measuring system is incorporated into a camera it becomes unnecessary to swing the camera so as to scan the scene to detect areas of different brightness.

Thus, it is an object of the present invention to provide a light-responsive system which is capable of discriminating between scene areas of different brightness without requiring the scene to be scanned.

Thus, it is an object of the present invention to provide a light-responsive system which can remain static or stationary with respect to a scene such as a scene which is to be photographed, while at the same time being capable of detecting those parts of the scene which have either maximum brightness or minimum brightness or both.

Furthermore it is an object of the present invention to provide a structure of the above type which is relatively simple while remaining highly effective to achieve the desired results.

In particular it is an object of the present invention to provide a structure of the above general type which includes electronic circuitry capable of being designed in a number of different ways so that a number of advantages are achieved such as the use of completely electronic circuitry, eliminating the necessity for solenoids, solenoid-operated switches, and the like, or utilizing either the charging of capacitors or the discharging of capacitors, or utilizing features such as differential amplifiers capable of compensating for fluctuations such as temperature fluctuations.

Also it is an object of the present invention to provide for a system of the above type a meter which indicates either maximum or minimum brightness of a scene while at the same time achieving linearity in the operation of the meter so that inaccuracies at any given range of operation of the meter are avoided.

Thus, it is an object of the present invention to provide an arrangement where the circuitry can be designed to achieve a great stability free of undesirable variations resulting from temperature fluctuations or voltage source fluctuations while at the same time utilizing simple elements.

Furthermore it is an object of the present invention to provide a construction which when used to detect both maximum and minimum brightness requires only a single photosensitive element which through suitable circuitry will indicate either maximum or minimum brightness.

According to the invention a plurality of photosensitive input means are supported by a suitable support means so as to provide inputs in response to light received by the plurality of photosensitive input means with these inputs respectively having magnitudes determined by the brightness of the light received by the plurality of photosensitive input means. Therefore where the scene has a condition of non-uniform brightness, a pair of the photosensitive input means will respectively provide inputs of maximum and minimum magnitude. An output means is provided for achieving a given output, and a plurality of electrical circuit means are respectively connected with the plurality of photosensitive input means and with the output means for providing at the latter an output determined by at least one of the pair of photosensitive input means.

BRIEF DESCRIPTION OF DRAWINGS

The invention is illustrated by way of example in the accompanying drawings which form part of this application and in which:

FIG. 1A shows schematically how it is possible with the structure of the invention to detect the brightness of different portions of a scene without a scanning motion;

FIG. 1B illustrates schematically one possible type of arrangement of photosensitive input means;

FIG. 1C illustrates another type of arrangement of photosensitive input means;

FIG. 1D is a schematic block diagram according to the basic principles of the invention;

FIG. 2 shows a circuit conforming to that of FIG. 1D and utilized for detecting the highest brightness of a scene;

FIG. 3 illustrates a circuit similar to that of FIG. 2 but fully electronic;

FIGS. 12–20 respectively illustrate various types of circuits for detecting the highest brightness of a given scene, the lowest brightness of a given scene, as well as both the highest and the lowest brightness, in the case of FIG. 20, utilizing partially or fully electronic circuits as well as the charging or discharging of a capacitor, with all of the circuits of FIGS. 12–20 including differential amplifiers;

DESCRIPTION OF PREFERRED EMBODIMENTS

Figure 4:
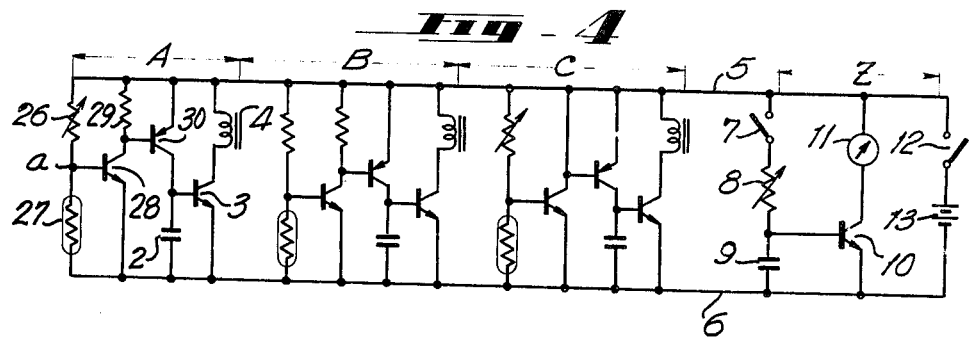
FIG. 4 illustrates a circuit arrangement suitable for detecting the lowest brightness of a given scene.

As is apparent from the introduction set forth above, in accordance with the present invention it becomes possible to detect the different degrees of brightness throughout a given object or scene which is to be photographed without movement of the structure which receives the light, so that movable scanning is not required. As may be seen from the schematic illustration in FIG. 1A, a plurality of photosensitive input means 402 are carried by a suitable support means 400 so that when the latter is directed toward the scene schematically indicated by the plane 403, the several photosensitive input means 402 will receive light from different parts of the scene or object to be photographed in order to respond to the intensity of the light at the different parts of the scene, thus giving a plurality of inputs in accordance with the brightness at the different parts of the scene without movable scanning being required.

In the case where the plurality of photosensitive input means 402 form part of a light meter for indicating the highest light intensity or the lowest light intensity, or both, then the plane 403 may be considered as the scene or object toward which the light meter is directed in order to measure the light. However in the case where the structure of the invention is incorporated into a camera the plane 403 may be considered as, for example, a surface of a viewfinder to which light is reflected after having passed through the objective so that it is this light at the plane 403 in the viewfinder of the camera which is detected and measured by the plurality of photosensitive input means 402, and of course with such a construction the detection of the highest or lowest brightness, or both, may be used for automatic control of the camera.

Referring to FIG. 1B, it will be seen that the several light-detecting photosensitive input means 402 may be arranged in such a way that they are distributed over the support means 400 to detect light from a multiplicity of parts of a given scene or object. Thus the three photosensitive means 402 illustrated in FIG. 1A may be considered as representing any one of the horizontal rows or any one of the vertical rows of photosensitive means 402 illustrated in FIG. 1B.

As will be apparent from the description below, each input provided from a single photosensitive means 402 may be used with the circuit means of the invention to contribute toward detection of either the highest brightness or the lowest brightness, and, in the case of FIGS. 21–27 each photosensitive means 402 provides a single input for detecting highest or lowest brightness. However with some embodiments, as illustrated, for example, in FIGS. 9 and 20, the highest and lowest brightness of a given scene or photograph may be simultaneously detected by pairs of photosensitive input means arranged beside each other with one of each pair of photosensitive means detecting the highest brightness and the other detecting the lowest brightness, and such an arrangement is illustrated in FIG. 1C where the support means 400 supports pairs of photosensitive input means 404 and 406 situated one beside the other as illustrated so that these pairs will operate as shown in FIG. 1A to pick up the light intensity from the object to be photographed and give a simultaneous indication of highest and lowest brightness as referred to below.

Referring to the block diagram of FIG. 1D, reference symbols such as A, B and C respectively designate photosensitive input and circuit units for partial scene brightness detection which are provided in a desired number. Z designates an output means or indicator station for measured light value which is adapted to be under control of said partial brightness detector units A, B, C . . . .

BASIC CIRCUITS

Now, with reference to FIG. 2 which illustrates a specific embodiment of the device to detect the highest brightness of an object to be photographed, reference symbols A, B and C respectively designate partial scene brightness detector units and Z designates an output means or indicator station for measured light value. The block A comprises a photosensitive input means, hereinafter referred to as CdS 1, which may be one of said light detector elements 402, and a circuit means including timing capacitor 2 serially connected to CdS 1 across positive and negative buses 5 and 6. A junction between CdS 1 and capacitor 2 is connected to the base of a transistor 3 of which the emitter is connected to the negative bus 6 and the collector is connected through an electromagnetic solenoid 4, adapted to control a switch 7 included in the output means block Z, to the positive bus 5. The blocks B and C are the same as block A and description in detail thereof is therefore omitted here. Transistors in blocks B and C correspond to the transistor 3 and are adapted to have their respective trigger voltage equivalent to that of said transistor 3.

The output means block Z comprises, in operative association with electromagnetic solenoid 4, a normally closed switch 7 adapted to be controlled also by any of the electromagnetic solenoids included in the blocks B and C. The output means also includes a variable resistance 8 for timing and a timing capacitor 9 serially connected with switch 7 across the positive and negative buses 5 and 6. A junction between variable resistance 8 and capacitor 9 is connected to the base of a transistor 10 of which the emitter is connected to the negative bus 6 and the collector is connected through a meter 11 to the positive bus 6, while a source switch 12 is serially connected to a power source 13 across the positive and negative buses 5 and 6.

The manner in which the device of FIG. 2 operates will now be described. Exposed to light of an object or scene to be photographed, each CdS presents an input according to its particular inner resistance since the intensity of light to which each CdS is exposed depends upon the distribution of brightness. Upon closure of the source switch 12 in such a situation, each of the timing capactiors begins to be charged through the CdS of each block A, B or C and at the same time the capacitor 9 of the block Z also begins to be charged.

Assumed that the CdS 1 of the block A is exposed to light of the highest brightness, the inner resistance thereof would be lower than any other CdS and the terminal voltage of the capacitor 2 of unit A would take the highest value, resulting in that the collector current of the transistor 3 would take the highest value and the electromagnetic solenoid 4 in unit A would be excited to the highest extent, thus opening the switch 7.

This results in that the capacitor 9 ceases to be charged, so that the meter 11 is fixed at the indication corresponding to the terminal voltage of said capacitor 9 at this moment and there is provided an output formed by the indication of information on brightness to which the CdS of block A is exposed.

Such an indication of the meter 11 will be never influenced by the information on light to which the other blocks are exposed even though the electromagnetic solenoids of said other blocks are excited later since the switch 7 has already been opened by the solenoid 4 of block A. The highest brightness value may be thus obtained from reading of the meter 11.

In FIG. 3 which illustrates another embodiment including an entirely electronic switching section converted from the mechanical one in the embodiment of FIG. 2, the parts common to those in FIG. 2 are designated by the common reference characters without any further description in detail since both embodiments are based on the same fundamental principle. The collector of the transistor 3 included in the block A is connected, on one side, through a resistance 14 to the positive bus 5 and is connected, on the other side, to the base of a transistor 15 of which the emitter is connected to the negative bus 6 and the collector is connected through a resistance 16 to the positive bus 5. Both the blocks B and C are of the same arrangement as the block A and the description thereof is omitted here. The transistor 15 and the corresponding transistors of the other blocks have their collectors respectively connected through capacitors 17, 18 and 19 for differentiation and resistances 17', 18' and 19' for damping, respectively, to the gate of a thyristor 21, whose gate is, in turn, connected through a resistance 20 to the negative bus 6. The anode of said thyristor 21 is connected to a resistance 22 and the base of a transistor 23. The other terminal of said resistance 22 and the emitter of said transistor 23 are connected to the positive bus 5 and the collector of said transistor 23 is connected to a resistance 24 and the base of a switching transistor 25. The other terminal of said resistance 24 is connected to the negative bus 6 while the emitter and the collector of said transistor 25 are connected to the positive bus 5 and one terminal of the variable resistance 8, respectively.

Now the manner in which the embodiment of FIG. 3 operates will be described. Upon closure of the source switch 12, the capacitor 2 and the capacitors of the other blocks corresponding thereto begin to be charged. The circuit condition at the moment where the switch 12 is closed is considered for better understanding of the manner in which this embodiment operates. The transistor 3 and the transistors included in the other blocks corresponding thereto are now OFF since the terminal voltage of the components such as the capacitor 2 is still zero, so that the components such as the transistor 15, adapted to be separately applied with signals from the components such as the transistor 3, are turned ON and the capacitors 17, 18 and 19 included in the output means block Z, adapted to be separately applied with signals from the collectors of said components such as the transistor 15, are grounded. This means that no signal is generated in the resistance 20. As a result, the thyristor 21, adapted to be driven by this signal, is non-operative and the transistor 23, adapted to be applied with signal from the anode of said thyristor 21, is OFF. The switching transistor 25, corresponding to the switch 7 in the embodiment of FIG. 2, is, therefore, ON and the capacitor 9 begins to be charged. A pointer of the meter 11 oscillates in accordance with variation of electric current flowing through the transistor 10 which is adapted to be applied with the charging voltage as time elapses. Assuming that the CdS 1 of unit A is exposed to light of the highest brightness, the transistor 3 is turned ON first and the transistor 15 of block A is turned OFF. Consequently, the signal generated at the collector of said transistor 15 is applied through the capacitor 17 for differentiation to the resistance 20 and thereby the thyristor 21 is turned ON and the transistor 23, adapted to receive the signal from the anode of said thyristor 21, is turned ON while the switching transistor 25 is turned OFF, preventing the capacitor 9 from being charged. The embodiment operates thereafter in the manner similar to the previous embodiment and only the highest brightness to which the CdS 1 of the block A is exposed is indicated by the meter 11 of the output means.

The embodiment of FIG. 3 is advantageous in the high responsiveness and precision with which brightness is discriminated, because of being free from the time delay of operation peculiar to the electromagnetic solenoid, as well as in the high practical usefulness provided because the several electromagnetic solenoids in the previous embodiment are not necessary and no mechanical switch is employed.

Referring to FIG. 4 which illustrates an embodiment to detect the lowest brightness, the parts common to those in the previous embodiments are designated by common references without description in detail thereof. In the block A, a variable resistance 26 is serially connected to a CdS 27 across the positive and negative buses 5 and 6, and the junction point a of the serial connection is connected to the base of transistor 28 whose emitter is connected to the negative bus 6 and whose collector is connected through a resistance 29 to the positive bus 5. Said collector is also connected to the base of a transistor 30, for current regulation, of which the emitter is connected to the positive bus 5 and the collector is connected to the timing capacitor 2 and the base of the transistor 3. Both the blocks B and C are of the same arrangement as the block A and description in detail thereof is omitted here.

In the embodiment of FIG. 4 upon closure of the source switch 12, the capacitor 2 begins to be charged through the transistor 30 and the transistors in the other blocks corresponding thereto also operate in the same manner. Assumed that the CdS 27 included in the block A is exposed to light of the lowest brightness, voltage Va at the point a would be higher than any of those in the other blocks and accordingly electric current flowing through the transistor 28 would be the largest. Electric current flowing through the transistor 30 also would be the largest, therefore, and the terminal voltage of the capacitor 2 would be the highest, so that the electromagnetic solenoid 4 of block A would operate first to open the switch 7 and thereby to stop oscillation of the meter 11. Thus, the lowest brightness may be seen from reading meter 11.

Figure 5:
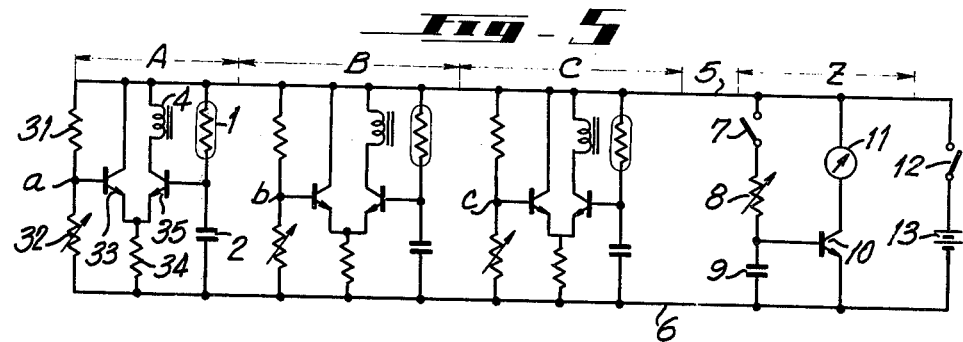
FIG. 5 illustrates a circuit utilizing differential amplifiers for detecting the highest brightness of a scene to be photographed.

FIG. 5 illustrates an embodiment of the device to detect the highest brightness utilizing a differential amplifier as a comparator and the parts common to those in the previous embodiments are designated by common references. In the block A, a resistance 31 is serially connected to a variable resistance 32 across the positive and negative buses 5 and 6 and the junction point a of said serial connection is connected to the base of a transistor 33 of which the collector is connected to the positive bus 5 and the emitter is connected through a resistance 34 to the negative bus 6. This emitter is connected to the emitter of a transistor so that said transistors 33 and 35 constitute the differential amplifier. Both the blocks B and C are of the same arrangement as the block A and description in detail thereof is omitted here.

An important difference between this embodiment and that of FIG. 2 is in employment of the differential amplifier which effectively reduces influence of factors such as the source voltage and the temperature to the lowest extent. In order that desired information provided from a plurality of light detector elements may be detected with high precision, as required for the device according to the present invention, the fundamental circuit operation should be stable independently of the external condition other than the object to be light-measured, and stability of the differential amplifier effectively meets such requirement.

In the embodiment of FIG. 5 upon closure of the source switch 12, divided voltage Va appears on the junction point a between the resistance 31 and the variable resistance 32 included in the block A. The variable resistance 32 or the variable resistances included in the other blocks corresponding thereto may be previously adjusted so that divided voltage Vb and Vc included in the blocks B and C which correspond to said divided voltage Va be equal to Va. In the block A, the timing capacitor 2 begins to be charged through the CdS 1 and, accordingly, the transistor 35 is turned ON at the moment when terminal voltage coincides with Va, and then the electromagnetic solenoid 4 is excited. Assumed that the CdS 1 of the block A is exposed to light of the highest brightness, the terminal voltage of the capacitor 2 increases more rapidly than in any other blocks so that the electromagnetic solenoid 4 operates first to open the switch 7 operatively associated therewith. Thereafter, the meter circuit operates as in the previously mentioned embodiments and provides an output indicative of the highest brightness.

Although all of the embodiments as mentioned hereinbefore utilize charging of a capacitor as means of detection, the present invention may be embodied also by utilizing discharge of a capacitor. An embodiment thereof will be now described with reference to FIG. 6. In the block A, the CdS 1 is serially connected to a variable resistance 36 across the positive and negative buses 5 and 6, and the junction point a of this serial connection is connected to a normally closed contact l of a change-over switch 37 operatively associated by a mechanical connecting structure with the corresponding components included in the other blocks. A movable blade of change-over switch 37 is connected through a timing capacitor 38 to the negative bus 6 and a normally opened contact m of change-over switch 37 is connected to a variable resistance 39 for timing and the base of a transistor 40. The other terminal of said variable resistance 39 is connected to the negative bus 6. The emitter of said transistor 40 is connected together with the emitter of a transistor 41 through a resistance 42 to the negative bus 6, and the collector of said transistor 40 is connected through the electromagnetic solenoid 4, for control of a switch 46 included in the block Z, to the positive bus 5. The collector of transistor 40 is also connected through a resistance 43 to the base of the transistor 41 and a resistance 44. The collector of transistor 41 is connected through a resistance 45 to the positive bus 5. The other terminal of resistance 44 is connected to the negative bus 6. Transistors 40 and 41 constitute a Schmitt circuit. The block B is of the same arrangement as the block A, and the block Z corresponds to that in the previous embodiments except that, in the present embodiment, the switch 46 is of a normally opened type which is adapted to be closed by excitation of the elements such as an electromagnetic solenoid 4. Description in detail of the blocks B and Z is therefore omitted here.

Figure 6:
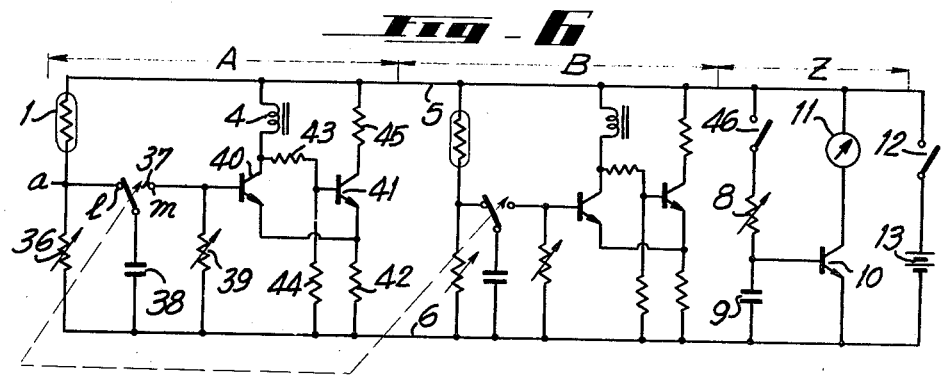
FIG. 6 shows a circuit for detecting the highest brightness but utilizing the discharge of a capacitor rather than the charging of a capacitor.

In the embodiment of FIG. 6 upon closure of the source switch 12, divided voltage is generated at the junction point a in the block A according to variation in the intensity of light to which the CdS 1 is exposed, and this divided voltage causes an electric charge to be stored in the timing capacitor 38 of which the terminal voltage is applied also to the Schmitt circuit, resulting, due to its characteristic, in that the transistor 40 on the input side thereof is turned ON. The electromagnetic solenoid 4 is in a non-operative state when the power source is connected, since electromagnetic solenoid 4 is inserted into the collector circuit of the transistor 40 on the input side, and the block B also is in the same state as the block A. With the circuit being in such a situation, the change-over switch 37 of interlocking type is now manually changed over from the contact *l* to the contact *m* to detect the highest brightness. This change-over causes the Schmitt circuit in each block to be reversed from ON to OFF or vice versa and the electromagnetic solenoid in each block is simultaneously excited so that switch 46 is closed at this instant. Accordingly, the timing capacitor 9 in the block Z begins to be charged from this moment, and the timing capacitor 38 begins, on the contrary, to be discharged, resulting in that the terminal voltage thereof gradually decreases.

Assuming that the block A is exposed to light of the highest brightness, the terminal voltage of the capacitor 38 would be the highest and the period of discharge thereof would be the longest, since voltage generated at the point *a* would be the highest. As a result, the Schmitt circuits in the blocks other than the block A will be earlier reversed again to their initial condition and, consequently, the electromagnetic solenoids in these blocks would be driven again to the non-operative condition.

However, the electromagnetic solenoid 4 of the block A is still in its operative condition even when the other electromagnetic solenoids are brought into the non-operative condition, so that the switch 46 remains closed and the capacitor 9 continues to be charged until the Schmitt circuit of block A is reversed again to bring the electromagnetic solenoid 4 into its non-operative state and thereby open the switch 46. Thus, oscillation of the meter 11 stops at a position corresponding to indication of the highest brightness.

Figure 7:
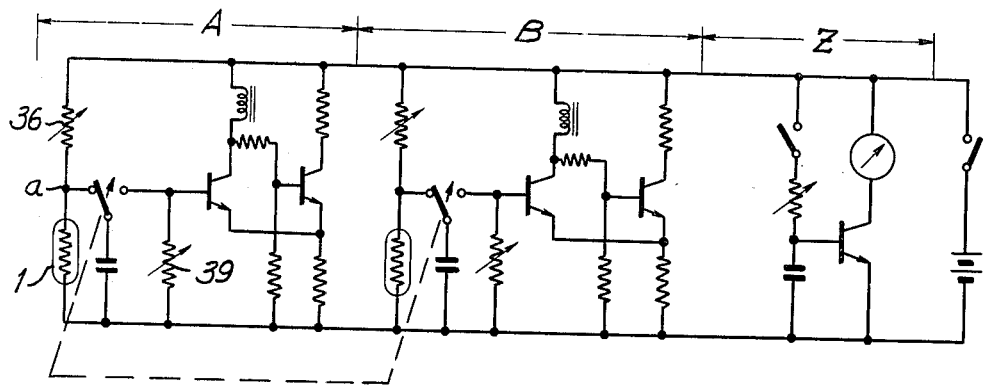
FIG. 7 shows a circuit also utilizing the discharge of a capacitor but utilized to detect the lowest brightness of a given scene.

FIG. 7 illustrates an embodiment to detect the lowest brightness utilizing discharge of the capacitor. This embodiment is identical to the embodiment of FIG. 6 except that the CdS and the variable resistance are inverted or reversely arranged with respect to the vertical. The embodiment of FIG. 7 operates in a manner such that, assuming the block A is exposed to light of the lowest brightness, voltage generated on the point *a* is the highest and this block would continue to be discharged for the longest period to provide the indication of the lowest brightness.

Figure 8:
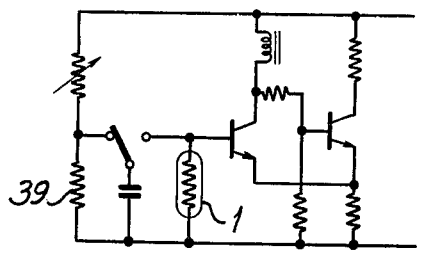
FIG. 8 fragmentarily illustrates a variation of the structure of FIG. 7 for detecting the lowest brightness.

FIG. 8 shows a detector block included in an embodiment in which the CdS and the discharge resistance in the embodiment of FIG. 7 are exchanged with each other, and the inner resistance of the CdS is utilized for discharging. In this embodiment, the lowest brightness may be detected, since the electromagnetic solenoid included in the block which has the CdS of the highest resistance is turned off last.

It is apparent from the foregoing description that the present invention may be embodied with electrical circuits of various types so as to provide a large flexibility of design.

Figure 9:
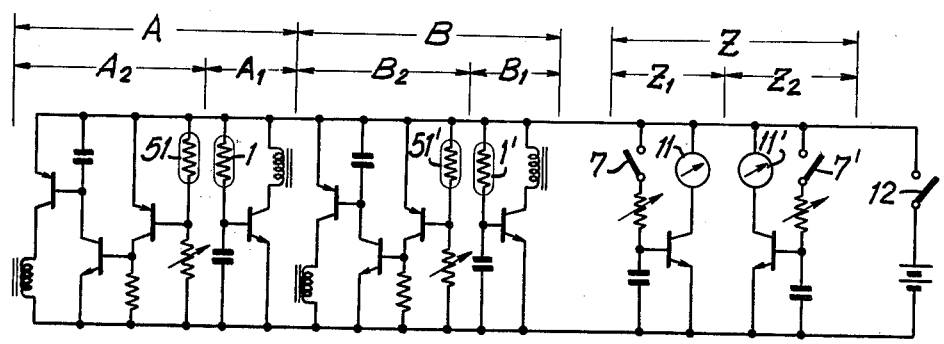
FIG. 9 shows one possible arrangement for simultaneously detecting the highest and the lowest brightness.

The foregoing description has been directed to the embodiments of the device to detect the highest brightness or the lowest brightness in a separate manner. Suitable combination of these embodiments may provide devices of various types to detect the highest and the lowest brightness in the same devices, of which an embodiment is illustrated by FIG. 9. Referring to FIG. 9, a block $A_1$ is of an arrangement corresponding to that of the block A in FIG. 2 and a block $A_2$ is of an arrangement corresponding to that of the block A in FIG. 4 which is reversed or inverted. Blocks $B_1$ and $B_2$ are of the same arrangements as $A_1$ and $A_2$, respectively, and there are provided a pair of detector circuits for the highest brightness and the lowest brightness, respectively, in each block A, B . . . . so that the light detector elements 1 and 51 or 1' and 51' are arranged close to each other. These elements may be elements 404 and 406 of FIG. 1C.

A block $Z_1$ corresponds to a circuit for indication of the highest brightness and a block $Z_2$ corresponds to a circuit for indication of the lowest brightness. The switch 7 in the former is adapted to be controlled by each of the electromagnetic solenoids of the blocks $A_1$ and $B_1$ while the switch 7' in the latter is adapted to be controlled by each of the electromagnetic solenoids of the blcck $A_2$ and $B_2$.

Assuming that the block A is exposed to light of the highest brightness and block B is exposed to light of the lowest brightness in the embodiment of FIG. 9, inner resistance of the CdS 1 and 51 would be the lowest and inner resistance of the CdS 1' and 51' would be the highest. Accordingly, upon closure of the source switch 12, the circuit including the CdS 51 in the block A operates as mentioned in reference with FIG. 4 with the latest switching while the circuit including the CdS 1 operates with the earliest switching as mentioned in reference with FIG. 2, and the switch 7 would be opened to cause the meter 11 to indicate a value of the highest brightness.

In the block B, on the other hand, switching operation of the detector circuit including the CdS 51' is earliest and the circuit including the CdS 1' operates latest so that a value of the lowest brightness may be indicated by the meter 11'.

Each of the variable resistances shown in FIGS. 4 to 9 is adjustable to set the divided voltage in each block to a common level or to set the point at which the switching circuit properly operates.

In each of the above embodiments wherein the result of detection is indicated by a meter from which the highest and lowest brightness may be quantitatively read out, oscillation of the pointer stops at a time point which depends upon the period for which each timing circuit to detect the highest or the lowest brightness value is charged or discharged, and the oscillation is in accordance with a function of said period. The lower the highest brightness is, therefore, the larger the magnitude of oscillation and vice versa. Thus, an actual value of the highest brightness may be indicated by this magnitude of oscillation.

However, the charging characteristic of a simple RC timing circuit is utilized in the block Z and its charging characteristic curve is, as well known, such that the increase of terminal voltage is more saturated as time elapses. This means that linearity of the obtained meter indication is reduced as time elapses, and it is slightly difficult to determine the highest and the lowest brightness values over a wide range in the quantitative manner.

Figure 10:
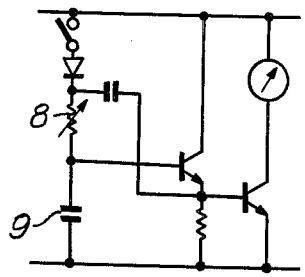
FIG. 10 illustrates a bootstrap circuit for improving the accuracy of operation of a meter.
Figure 11:
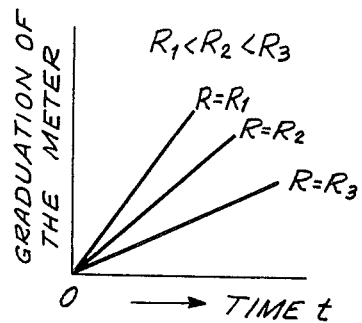
FIG. 11 illustrates in graph form the manner in which the meter can be regulated with the circuitry of FIG. 10.

There is provided an electric circuit to generate linear slope voltage as an indicator circuit adapted to overcome this disadvantage. FIG. 10 shows a bootstrap circuit as an embodiment of such a circuit. With such a circuit, reading of the meter is linear with respect to elapsing of time as shown by FIG. 11, and the slope of this straight line may be varied by variation of a resistance value R of the variable resistance 8 in FIG. 10. Said resistance value R may be selected from the whole amplitude necessary with respect to the elapsing time.

As obvious from the foregoing description, the device to detect the highest and the lowest brightness according to the present invention may automatically detect and measure the highest and the lowest brightness of an object to be photographed in a static manner merely by directing a group of light detector elements toward the object without kinetic scanning or the like as is conventionally used. When the device is incorporated into a camera, light measuring may be effected without swaying the camera and, even with respect to an object to which film might be exposed with difficulty, the proper exposure matching with the density curve of the film may be obtained without a high skillfulness, thus providing photography of high quality. When the detection and light measuring are carried out through a comparator such as a differential amplifier, influence of factors such as the source voltage and the temperature may be reduced to the lowest degree so that operation of the device is stable and almost free from any influence of the external factors other than the object to be light-measured, improving its practical usefulness. Furthermore, according to the present invention, operating time difference of the timing circuit to detect the highest or the lowest brightness is introduced to control the timing circuit for indication of measured light value so that the indicator member adapted to be driven by electric current according to voltage stored in the capacitor included in the last-mentioned circuit may quantitatively indicate the brightness. Accordingly, the lower the brightness is, the larger the magnitude of oscillation of the meter pointer and vice versa, and an actual value of the highest brightness may be indicated by this particular magnitude of oscillation.

DIFFERENTIAL AMPLIFIER CIRCUITS

Now the embodiments will be described referring to FIGS. 12 to 20 of the accompanying drawing.

Figure 12:
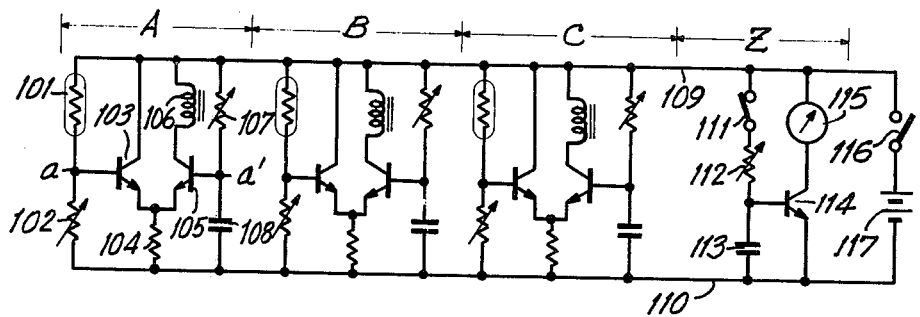

Referring to FIG. 12, A, B, C and Z correspond to the partial brightness detector blocks A, B and C and the indicator block Z shown by FIG. 1D, respectively. The block A in FIG. 12 comprises a CdS 101 and a variable resistance 102 serially connected to said CdS, these two elements being inserted between a positive bus 109 and a negative bus 110. A transistor 103 has a base to which the junction point $a$ of this serial connection is connected. Its emitter is connected through a resistance 104 to the negative bus 110, and its collector is connected to the positive bus 109. Another transistor 105 has an emitter to which the emitter of said transistor 103 is connected, while its collector is connected through an electromagnetic solenoid 106, adapted to control a switch 111 of the block Z, to the positive bus 109 and its base is connected to the junction point $a'$ between variable resistance 107 for timing and a timing capacitor 108, these two elements being serially connected between the positive bus 109 and the negative bus 110. Transistors 103 and 105 constitute a differential amplifier. The blocks B and C are of the same arrangement as the block A and, therefore, no description in detail of these two blocks B and C is given here.

The capacitor 108 has a characteristic curve, according to which the terminal voltage rises, similar to those of the corresponding capacitors in the other blocks.

The block Z comprises an electromagnetic solenoid 106, a normally closed switch 111 adapted to be opened in operative association with excitation of each electromagnetic solenoid in the other blocks which corresponds to said solenoid 106, a variable resistance 112 for timing and a timing capacitor 113, these elements being serially connected between the positive bus 109 and the negative bus 110. A transistor 114 has a base to which the junction point between variable resistance 112 and capacitor 113 is connected, an emitter which is connected to the negative bus 110 and a collector which is connected through a meter 115 to the positive bus 109. A source switch 116 and a source 117 are serially connected between the positive bus 109 and the negative bus 110.

The manner in which the embodiment of FIG. 12 operates will be now described. Upon closure of the source switch 116, the capacitor 113 begins to be charged and at the same time the meter 115 begins to oscillate and, on the other hand, a voltage $Va$ appears on the junction point $a$ according to a brightness of the light to which the CdS 101 is exposed, as the capacitor 108 also begins to be charged. For a certain time after closure of the source switch 116, the transistor 103 remains ON and the transistor 105 remains OFF due to the bias voltage generated in the resistance 104, so that the electromagnetic solenoid 106 is non-operative. the blocks B and C also operate in the similar manner. Assumed that the CdS 101 is exposed to light of the lowest brightness, the voltage $Va$ would take the lowest value relative to those of the rest blocks. Consequently, the terminal voltage $Va'$ of the capacitor 108 becomes equal to $Va$ prior to the corresponding voltages in the other blocks as said capacitor 108 and the others begin to be charged after a time lapse, and the transistor 105 transfers to ON state. Then, the electromagnetic solenoid 106 of block A operates first to open the switch 111, interrupting the charging of the capacitor 113 and stopping the oscillation of the meter 115, which, in turn, indicates then a value of measured light of the lowest brightness.

Figure 13:
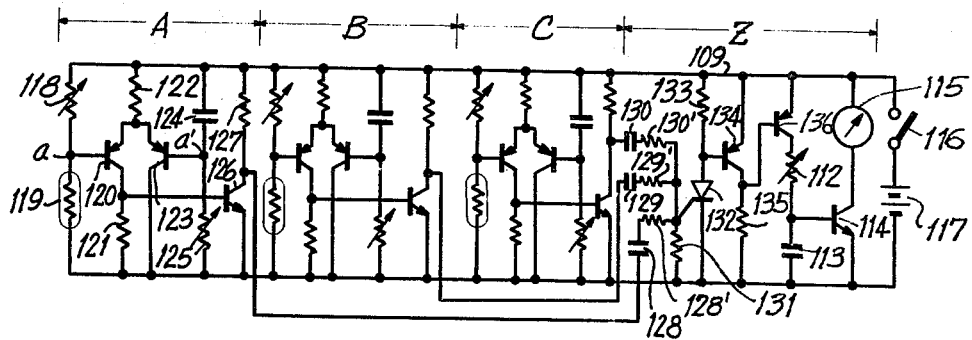

FIG. 13 illustrates a specific embodiment of the device to measure the lowest brightness according to the present invention, in which the mechanical switching control by the elements such as the electromagnetic solenoid 106 in FIG. 12 is entirely replaced by an electronic control. In block A, a variable resistance 118 and a CdS 119 are serially connected between the positive bus 109 and the negative bus 110, and the junction point $a$ of this serial connection is connected to the base of a transistor 120 of which the collector is connected to a resistance 121 and to the base of a transistor 126. The emitter of said transistor 120 is connected to a resistance 122 and the emitter of a transistor 123. The other ends of resistances 121 and 122 are connected to the negative bus 110 and the positive bus 109, respectively. The collector of the transistor 123 is connected to the negative bus 110 and the base thereof is connected to the connection point $a'$ of a capacitor 124 for timing and a variable resistance 125 for timing serially connected between the positive bus 109 and the negative bus 110. The emitter of the transistor 126 is connected to the negative bus 110 and the collector thereof is connected on the one side, through a resistance 127 to the positive bus 109 and, on the other side, to a capacitor 128 for differentiation of a block Z. Blocks B and C are of the same arrangement as block A and, therefore, no detailed description thereof is given here. Capacitor 128 is of a characteristic curve such that its terminal voltage rises at the rate at which those of the corresponding capacitors in the blocks B and C rise as these capacitors are charged.

A block Z is of an arrangement such that there are provided in series, respectively with a capacitor 128, and capacitors 129 and 130 corresponding to capacitor 128, capacitors 129 and 130 being connected to the blocks B and C, respectively, buffer resistances 128', 129' and 130' of which the other terminals are together connected to the gate of a thyristor 132 and a resistance 131, the other terminal of resistance 131 and the cathode of said thyristor 132 being connected to the negative bus 110. The anode of thyristor 132 is connected through a resistance 133 to the positive bus 109, this anode being connected also to the base of a transistor 134 of which the emitter is connected to the positive bus 109 and the collector is connected to a resistance 135 and to the base of a switching transistor 136. The other terminal of resistance 135 is connected to the negative bus 110, and the emitter of transistor 136 is connected to the positive bus 109, while the collector thereof is connected to the variable resistance 112. The rest of this arrangement is identical to that of FIG. 12.

The manner in which the embodiment of FIG. 13 operates will now be described. Upon closure of the source switch 116, a divided voltage $Va$ is generated in the variable resistance 118 at its opposite terminals and, as a result, the transistor 120 is now in the ON-state and the transistor 126 to which a signal is applied from the collector of transistor 120 is also in the ON-state. This causes the capacitor 128 of the block Z to be grounded, and both the capacitors 129 and 130 are similarly caused to be grounded by the blocks B and C, respectively, so that no signal is generated in the resistance 131. Consequently, the thyristor 132 is now in non-operative state and the transistor 134 is in the OFF-state while the switching transistor 136 is in the ON-state, so that the capacitor 113 begins to be charged and the meter 115 is caused, by electric current flowing through the transistor 114 to which the charging voltage is applied, to be gradually driven as time elapses. The closure of the source switch 116, on the other hand, causes the timing capacitor 124 of the block A and the other capacitors corresponding thereto of the other blocks also to begin to be charged, resulting in their terminal voltages $Va'$ etc. gradually increasing. Assuming that the block A is exposed to light of the lowest brightness, divided voltage $Va$ would be the lowest one relative to those in the other blocks and the voltage $Va'$ would become equal to the voltage $Va$ first of all, turning the transistor 123 ON. The bias voltage in the resistance 122 increases until the transistor 120 is turned OFF and the transistor 126 to which a signal is applied from said transistor 120 is reversed from ON-state to OFF-state. As a result, the grounded condition of capacitor 128 is now eliminated and the charging signal is applied to the gate of the thyristor 132 which is then turned ON, so that the transistor 134 also is turned ON and the transistor 136, corresponding to the switch 111 in FIG. 12, is turned OFF. Thus, the capacitor 113 ceases to be charged and the meter 115 indicates a measured value of the lowest brightness.

In view of structural complexity of the embodiments as mentioned hereinbefore wherein every partial brightness detector block includes its own timer circuit for comparison, there are provided further modified embodiments each using a signal timer circuit which corresponds to the combination of the plurality of timer circuits for the respective blocks and serves as a timer circuit for indication of a photometric value. Referring to FIG. 14 showing one of these modified embodiments, which is a device for the highest brightness detection, the parts common to those in the previous embodiments are designated by common reference characters without description in detail thereof. In the block A, the junction point $a$ between the variable resistance 118 and the CdS 119 is connected to the base of the transistor 103. This is true also in the blocks B and C. The base of the transistor 105 and the corresponding transistors of the other blocks are together connected to the junction point between the variable resistance 112 and the capacitor 113 in the block Z.

The manner in which the embodiment of FIG. 14 operates will be now described. Upon closure of the source switch 116, there are generated at the junction points $a$, $b$ and $c$ between the variable resistances and the associated CdS in the blocks A, B and C, respectively, the divided voltages which take values inversely proportional to the amount of light to which the respective CdS elements are exposed, namely, the brightness of the object to be photographed. Assuming that the block A is exposed to light of the highest brightness, the voltage appearing at the point $a$ would be the lowest. Upon closure of the source switch 116, on the other hand, the capacitor 113 included in the timer circuit for indication of the block Z also begins to be charged, so that the terminal voltage of said capacitor 113 rises as time elapses. This rising voltage is evenly applied to the transistors following the associated differential amplifiers in the blocks A, B and C so that the transistor 105 of the block A in which the voltage appearing on the point $a$ takes the lowest value is turned ON earlier than in the other blocks and the electromagnetic solenoid 106 of block A is excited. Under control of this excitation, the switch 111 of the block Z is opened and a value of the highest brightness is indicated.

FIG. 15 shows an embodiment of the device to detect the highest brightness in which the mechanical switching control is entirely replaced by the electronic control as in the embodiment of FIG. 13. The parts of this embodiment common to those of the previous embodiment are designated by common references without description in detail thereof. The block A is of an arrangement such that the point $a$ between the CdS 101 and the variable resistance 102 is connected to the base of the transistor 120. Arrangement of the blocks B and C also are the same as the block A. In the block Z, the junction point between the thyristor 132 and the resistance 133 is connected to the base of a transistor 137 of which the collector is connected to the positive bus 109 and the emitter is connected to a resistance 138 and to the base of a transistor 139 for current control. The other terminal of resistance 138 is connected together with the emitter of transistor 139 to the negative bus 110. The collector of transistor 139 is connected to a timing capacitor 140 and to the base of a transistor 141. The other terminal of capacitor 140 and the emitter of said transistor 141 are connected to the positive bus 109, and the collector of transistor 141 is connected through a meter 142 of the negative bus 110. To the junction point between transistor 139 and capacitor 140 the bases of the transistor 123 and the corresponding transistors in the other blocks are together connected.

The manner in which the embodiment of FIG. 15 operates will now be described on the assumption that, as in the previous embodiments, the block A is exposed to light of the highest brightness. Upon closure of the source switch 116, the voltage generated on opposite terminals of the CdS 101 takes a value lower than any of the CdS included in the other blocks. The tyyristor 132 of the block Z is initially in the OFF-state as in the case of FIG. 13, so the transistor 137 is in the ON-state and, therefore, the transistor 139 also is in the ON-state. Accordingly, the timing capacitor 140 begins to be charged. The terminal voltage of the capacitor 140 which rises as said capacitor 140 is charged is applied to the bases of the transistors following the associated differential amplifiers in the blocks A, B and C, respectively, so that the transistors 123 of the block A is turned ON first, the transistors 120 is turned OFF and same operation as in FIG. 13 takes place until the thyristor 132 is turned ON. As a result, the transistors 137 and 139 are turned OFF and the capacitor 140 ceases now to be charged. The meter 142 indicates a value of the highest brightness as measured at this moment.

FIG. 16 illustrates an embodiment to detect the lowest brightness in which the timer circuit of the block Z effectively replaces the timer circuits respectively employed by the blocks A, B and C as illustrated by FIG. 12 and effectively serves in the place of these timer circuits. This embodiment corresponds, on the other hand, to the one wherein the CdS and the associated variable resistances are arranged in the upside down or inverted manner with respect to the embodiment as illustrated by FIG. 14. The manner in which this embodiment operates will be readily understood from reading the description of the previous embodiment and the parts shown which are common to those in the previous embodiment are designated by common references without description in detail thereof.

Figure 17:
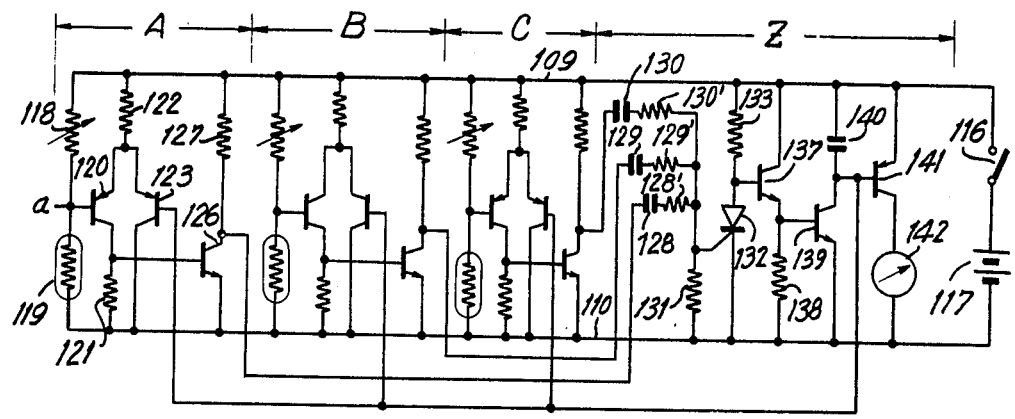

FIG. 17 iIllustrates another embodiment of the device to detect the lowest brightness in which a single timer circuit comprising the transistor 139 for current control and the timing capacitor 140 of the block Z replaces a plurality of timer circuits in FIG. 13. This embodiment corresponds, on the other hand, to the one wherein the CdS and the associated variable resistances are arranged inverted with respect to the embodiment of FIG. 15. The parts shown which are common to those of FIG. 15 are designated by the common references without description in detail thereof.

Figure 18:
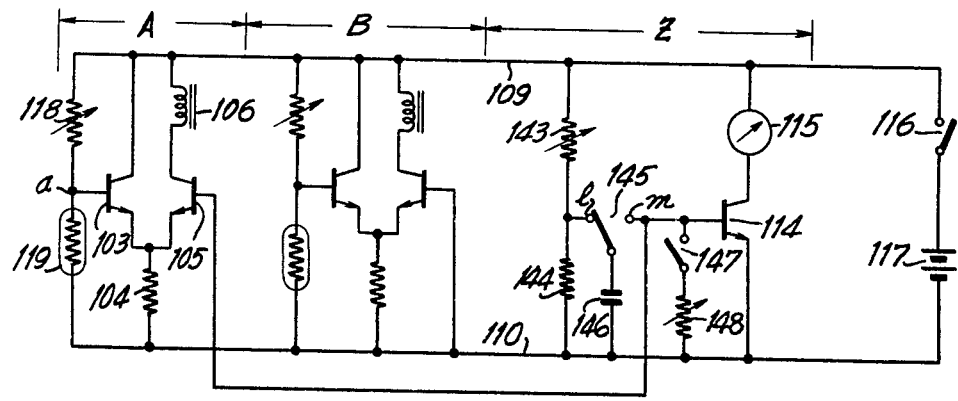

Although the present invention has been hereinbefore described with respect to the embodiments in which the electrical scanning and detection is accomplished by utilization of variation in voltage due to charging of the timer circuits, the present invention may be realized by utilization of said variation in voltage due to discharge of the timer circuits for scanning. Referring to FIG. 18 illustrating such an embodiment of the device to detect the highest brightness, the blocks A, B each has the same arrangement as that of the block A of FIG. 14, and the block Z is of an arrangement such that a variable resistance 143 and a resistance 144 are serially connected between the positive bus 109 and the negative bus 100, the junction point between variable resistance 143 and resistance 144 being connected to a normally closed contact $l$ of a change-over switch 145 of which the movable blade is connected through a timing capacitor 146 to the negative bus 110. A normally open contact $m$ of change-over switch 145 is connected to the base of the transistor 114. A switch 147 of normally opened type is adapted to be closed when any one of the electromagnetic solenoids in the blocks A, B is excited, and a variable resistance 148 for timing is serially connected between the base of transistor 114 and the negative bus 110. The bases of the transistors following the associated differential amplifiers included in the blocks A, B are together connected to said normally opened contact $m$.

In the embodiment of FIG. 18, upon closure of the source switch 116, there is generated at the junction point between the variable resistance 143 and the resistance 144 in the block Z a divided voltage with which the capacitor 146 is charged to a predetermined voltage. When the movable blade of the change-over switch 145 is changed over from the contact $l$ to the contact $m$, the voltage stored in the capacitor 146 is applied to the base of the second or followed transistor of each differential amplifier.

The meter 115 oscillates at once to the highest graduation corresponding to the stored voltage at this moment. All the second transistors of the respective differential amplifiers are turned ON at once and all the electromagnetic solenoids are thus excited so far as the stored voltage has previously been selected sufficiently higher than the voltage generated by the respective CdS. This causes the switch 147 to be closed and thereby the capacitor 146 begins to be discharged. Consequently, the indication of the meter 115 begins to be gradually brought back again to the initial point as the voltage stored in said capacitor 146 decreases. In the course of such voltage drop, the particular second or following transistor of the particular differential amplifier which is exposed to the highest one of the voltages generated in the respective CdS is turned OFF first, deenergizing the electromagnetic solenoid included in the associated circuit means. However, the switch 147 still remains closed, since the other electromagnetic solenoids remain energized.

The capacitor 146 is further discharged until the last electromagnetic solenoid is deenergized and at this moment the switch 147 is opened, and the backward oscillation of meter 115 stops at this moment, indicating a particular value of the brightness at this time point. This brightness value corresponds to the highest brightness value, since this value is derived from the CdS exposed to light of the highest brightness.

Modification of the embodiment illustrated by FIG. 18 such that each CdS and the variable resistance serially connected to said CdS are reversed to be arranged in an upside down manner brings about an embodiment of the device for detection of the lowest brightness. This relationship is similar to that between the embodiment of FIG. 14 and the embodiment of FIG. 16, so that this modification is not described here in its details.

Figure 19:
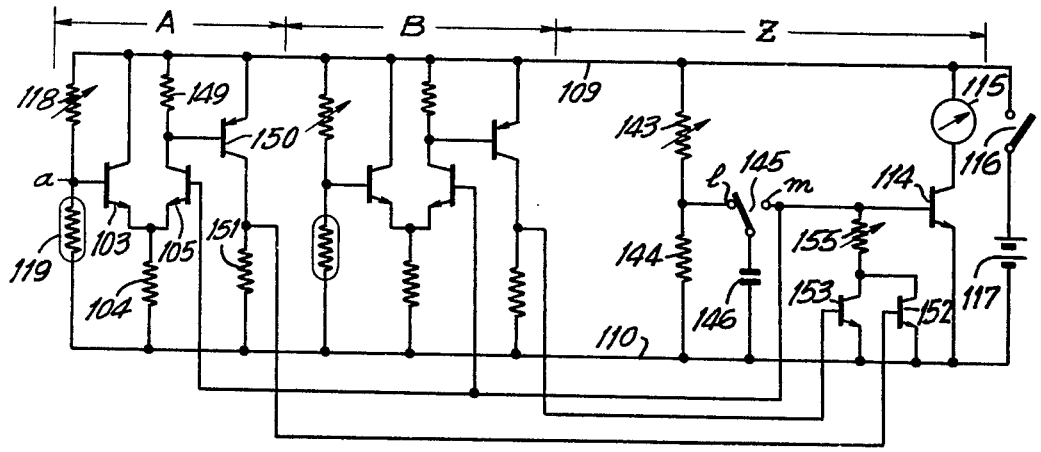

FIG. 19 illustrates an embodiment of the device for detection of the highest brightness wherein the mechanical switching control in the embodiment of FIG. 16 is entirely electronic and the parts common to the embodiment of FIG. 16 are designated by common references without description in detail thereof. In the block A, the collector of the transistor 105 is connected to a resistance 149 as well as to the base of a transistor 150 of which the emitter is connected together with the other terminal of said resistance 149 to the positive bus 109 and the collector is connected through a resistances 151 to the negative bus 110. The block B is the same as block A. In the block Z, one terminal of a variable resistance 155 for timing is connected to a junction point between the change-over switch 145 and the transistor 114, the other terminal of variable resistance 155 is connected to the collectors of switching transistors 152, 153 of which the emitters are connected to the negative bus 110 and the bases are connected to the collectors of the transistor 150 in the block A and the corresponding transistor in the block B, respectively.

In the embodiment of FIG. 19, upon closure of the source switch 116, each transistor such as the second transistor 105 of each differential amplifier in each block, for example, the block A or B, is turned OFF as in the case of FIG. 18, and each transistor such as the transistor 150 coupled to a transistor such as the transistor 105 is also turned OFF, so that the transistors 152, 153 of the block Z which are supplied from these transistors, such as the transistors 105, 150, with signals, respectively, are also turned OFF. This state corresponds to the opening of the switch 147 in FIG. 18. Upon changing over the change-over switch 145 from the contact $l$ to the contact $m$ for detection of the brightness, a relatively large voltage stored in the capacitor 146 is applied to each transistor such as the second transitor 105 of each differential amplifier, turning this ON. As a result, each transistor such as the transistor 150 which is associated with said transistor 105 is turned ON and the transistors 152, 153 of block Z are accordingly turned ON. In this manner, the capacitor 146 begins to be discharged through variable resistance 155. The capacitor 146 is further discharged until, as previously described in reference with FIG. 18, the transitor 105 of the block A in which the CdS is exposed to light of the highest brightness and supplies transistor 105 with the highest terminal voltage is turned OFF later than any one of the corresponding transistors in the other blocks and causes the transistor 150 to be turned OFF. The switching transistor 152 which has been ON is now turned OFF and the capacitor 146 ceases to be discharged. An indication corresponding to the highest brightness at this moment is provided by the meter 115.

Figure 20:
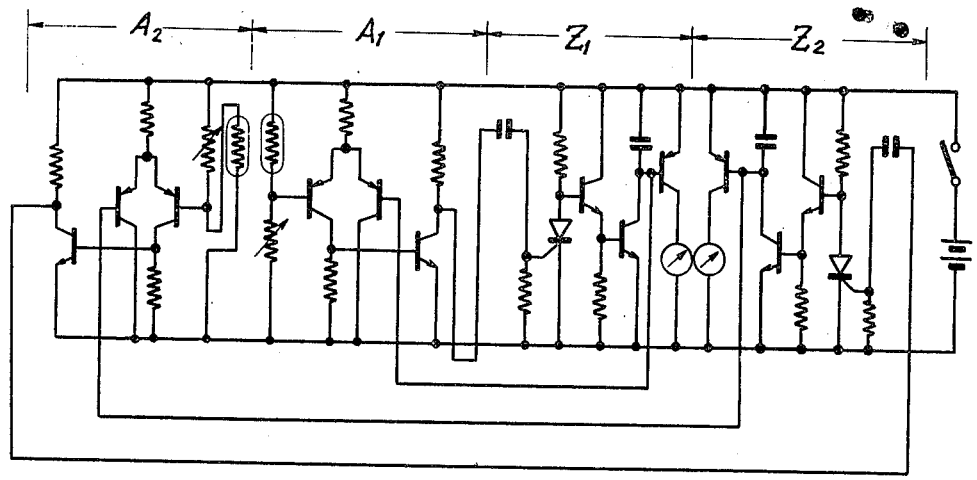

Although the embodiments which have been described hereinbefore individually serve as the devices for detection of the highest or the lowest brightness, these embodiments may be combined to provide devices adapted for detection of both the highest and the lowest brightness by use of the same devices. Referring to FIG. 20 showing an embodiment of such combinations, the blocks $A_1$ and $Z_1$ correspond to the blocks a and Z in FIG. 15, respectively, and the blocks $A_2$ and $Z_2$ correspond to the blocks A and Z in FIG. 17, respectively. In practical use, a plurality of pairs each comprising the highest brightness detector block such as $A_1$ and the lowest brightness detector block such as $A_2$ are provided and each pair of CdS elements included in each pair of said blocks such as $A_1$ and $A_2$ are arranged adjacent to each other (FIG. 1C) for detection over the respective partial area so that information on the highest and the lowest brightness of an object to be photographed may be simultaneously indicated by the respective meters of the blocks $Z_1$ and $Z_2$, respectively. The manner in which this embodiment operates is not described here since this will be easily understood from combination with the previous embodiments.

It is apparent from the foregoing description that the deviced for detection of the highest and/or the lowest brightness according to the present invention may achieve photometric detection of the highest and/or the lowest brightness of the photographed object in an automatic and static manner simply by directing the group of photo-detective elements toward the object instead of utilizing means such as a kinetic scanning of the object as conventionally utilized. Also in the case that the device of this invention is incorporated into a photographic camera, light measuring may be effectively achieved without moving the camera and a correct exposure to be matched with a particular density curve of the film used may be easily obtained to provide photography of high quality even with respect to a photographed object whose exposure has conventionally been difficult. In the embodiments wherein said detection and light measuring are accomplished through the comparators such as the differential amplifiers, the practicality of the device may be remarkably improved since the device operates substantially free from any fluctuating influences of ambient factors such as the source voltage and the temperature. Thus, the device may operate with high stability in response substantially only to an object to be photometrically detected. Furthermore, in accordance with the present invention, a difference in the working time of the timer circuits for detection of the highest or the lowest brightness is introduced to control the timer circuit for indication of the photometric value so that brightness may be quantitatively indicated by a member for indication, which is adapted to be electrically driven according to the voltage stored in a capacitor included in the circuit. This means that the higher a particular value of, for example, the highest brightness, the larger the oscillation of the meter and vice versa, and said particular value may be easily determined. The present invention thus provides various advantages for practical use.

CIRCUITS WITH SINGLE INPUTS FOR MAXIMUM AND MINIMUM BRIGHTNESS

Now, embodiments will be described with reference to FIGS. 21 to 27.

Although the present invention has been described above with respect to embodiments in the form of the devices for detection of the highest brightness, embodiments in the form of the devices for detection of the lowest brightness, and embodiments for simultaneous detection of the highest as well as the lowest brightness, the latter may be further modified and a third aspect of the present invention relates to this modification. The previously described embodiments of the device for simultaneous detection of the highest and the lowest brightness each simply comprises a combination of the first-mentioned device and the second-mentioned device, wherein the photosensitive elements of the respective unit devices are arranged in a suitable relationship for the desired partial light measuring of which the result effectively provides simultaneous detection of the highest and the lowest brightness. With such an arrangement, however, the number of the photosenstive elements as equals twice the spots or areas to be light-measured as shown in FIG. 1C, and, accordingly, the area over which these photosensitive elements are disposed is disadvantageously enlarged. This reduces the precision of partial light measuring and brings about structural complexity.

These disadvantages are effectively overcome by a modification wherein photosensitive elements distributed to detect partial brightness of an object to be photographed and resistor elements serially connected to these photosensitive elements, respectively, provide information on the respective partial brightness which is, in turn, applied to detector blocks for higher and lower brightness separately arranged, and the highest or the lowest output from each of said partial brightness detector blocks is determined for simultaneous indication of the highest and the lowest brightness values. This modification will be now described in detail referring to the accompanying drawing.

Figure 21:
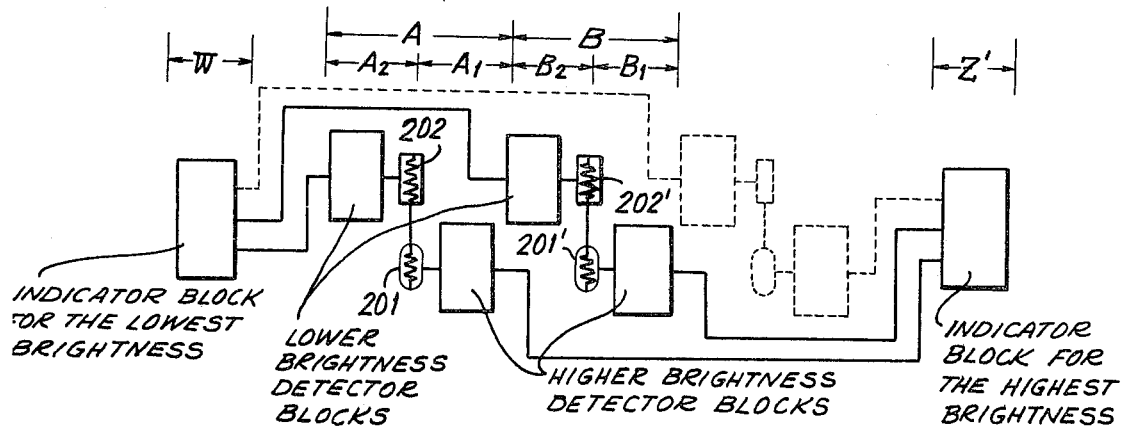
FIGS. 21 and 22 respectively illustrate schematically different types of circuit arrangements for detecting simultaneously the highest and lowest brightness of a given scene while utilizing a single photosensitive input means for detection of both the highest and the lowest brightness.
Figure 22:
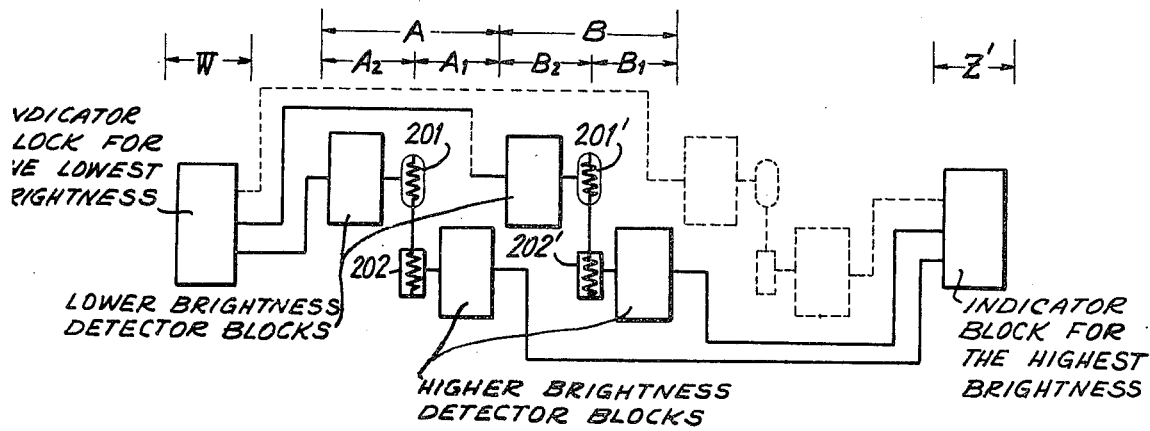

In FIG. 21, which schematically illustrates this modification, reference numerals 201, 201' designate said photosensitive elements and reference numerals 202, 202' designate said resistor elements serially connected to said photosensitive elements, respectively. The photosensitive elements 201, 201' are coupled to higher brightness detector blocks $A_1$, $B_1$, respectively, which are, in turn, coupled to an indicator block Z' for the highest brightness so as to control this indicator block Z'. The resistor elements 202, 202' are coupled to lower brightness detector blocks $A_2$, $B_2$ which are, in turn, coupled to an indicator block W of the lowest brightness so as to control this indicator block W. The higher brightness detector block $A_1$ and the lower brightness detector block $A_2$ consititute one block or unit A. The block B includes a desired number of such higher and lower brightness detector blocks therein. Location of the photosensitive elements and the resistor elements as shown by FIG. 21 may be reversed in an upside down manner as shown by FIG. 22, depending upon the particular operative characteristic of the brightness detector blocks to which the photosensitive elements and said resistor elements are coupled.

Figure 23:
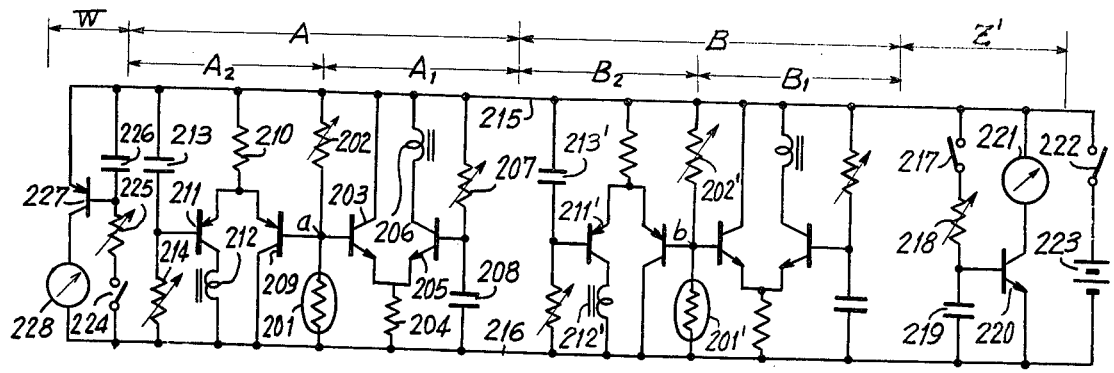
FIGS. 23–27 respectively illustrate the details of various types of circuits which conform to the block diagrams of FIGS. 21 and 22.

Referring to FIG. 23 which shows a specific embodiment corresponding to FIG. 21, the blocks common to those in FIG. 21 are designed by common references. In the block $A_1$, a variable resistance 202 and a CdS 201 serving as the photosensitive element or input means are serially connected between positive and negative buses 215 and 216. The junction point $a$ of the serial connection is connected to the base of a transistor 203 of which the collector is connected to the positive bus 215 and the emitter is connected to a resistance 204 and the emitter of a transistor 205, the other terminal of said resistance 204 being connected to the negative bus 216. The collector of transistor 205 is connected through an electromagnetic solenoid 206, adapted to controllably open a switch 217 of the block Z', to the positive bus 215, and the base of said transistor 205 is connected to the junction point between a variable resistance 207 for timing and a timer capacitor 208, both serially inserted between the positive bus 215 and the negative bus 216 so that said transistors 203 and 205 constitute a differential amplifier. In the block $A_2$, the point $a$ is connected to the base of a transistor 209 of which the collector is connected to the negative bus 216 and the emitter is connected to a resistance 210 and to the emitter of a transistor 211. The other terminal of resistance 210 is connected to the positive bus 215. The collector of 211 is connected through an electromagnetic solenoid 212, adapted to controllably open a switch 224 of the block W, to the negative bus 216, and the base of transistor 211 is connected to the junction point between a timer capacitor 213 and a variable resistance 214 for timing, both serially inserted between the positive bus 215 and the negative bus 216 so that said transistors 209 and 211 constitute a differential amplifier. The block B has the same arrangement as the block A.

In the block Z' a normally closed switch 217, adapted to be opened by energization of electromagnetic solenoid 206 or the corresponding electromagnetic solenoid in the block B, a variable resistance 218 for timing and a timer capacitor 219 are serially connected between the positive bus 215 and the negative bus 216. The junction point between variable resistance 218 and the capacitor 219 is connected to the base of a transistor 220 of which the emitter is connected to the negative bus 216 and the collector is connected through a meter 221 to the positive bus 215. A source switch 222 and a source 223 are serially connected between the positive bus 215 and the negative bus 216.

In the block W, a normally closed switch 224, adapted to be opened by energizing of electromagnetic solenoid 212 or the corresponding electromagnetic solenoid in the block B, a variable resistance 225 for timing and a timer capacitor 226 are serially connected between the positive bus 215 and the negative bus 216, and the junction point between variable resistance 225 and capacitor 226 is connected to the base of transistor 227 of which the emitter is connected to the positive bus 215 and the collector is connected through a meter 228 to the negative bus 216 so that each timer circuit of each higher brightness detector block and each timer circuit of each lower brightness detector block have an equivalent charging characteristic.

The manner in which the embodiment of FIG. 23 operates will be now described. Upon closure of the source switch 222, on the assumption that the block B is applied with an input according to the lowest brightness, the timer capacitors 219, 226 of the blocks Z and W, respectively, begin to be charged, and oscillation of the meters 221, 228 increases as the terminal voltage of the capacitors rises. The source voltage is applied also to the timer circuits of the respective brightness detector blocks and, as a result, the timer capacitors 208, 213 ... also begin to be charged while a divided voltage appears on the point $a$ of the serial circuit comprising the CdS 201 and the variable resistance 202. Consequently, the first transistors 203, 209 ... preceding the respective differential amplifiers remain ON and the second transistors 205, 211 ... following the respective differential amplifiers remain OFF for a while after application of the source voltage.

Inner resistance of the CdS 201 takes the lowest value since it is assumed that the block A has an input according to the highest brightness, so that a voltage Va appearing on the point $a$ takes the lowest value. Thus, the terminal voltage of the timer capacitor 208 reaches the value Va first turning the transistor 205 ON, and there occurs energization of the electromagnetic solenoid 206 which opens, in turn, the normally closed switch 217. As a result, the capacitor 219 ceases to be charged and oscillation of the meter 221 in accordance with the terminal voltage of said capacitor 219 indicates a value of the highest brightness at this moment.

The indication of the meter 221 will not be influenced by energization of the electromagnetic solenoids of the other highest brightness detector blocks which may occur after energization of said electromagnetic solenoid 206 since the switch 217 has already been opened.

Assuming that the block B is applied with an input according to the lowest brightness, inner resistance of CdS 201' would take the highest value so that the terminal voltage Vb of the variable resistance 201' would take the lowest value with respect to the corresponding terminal voltages. Thus, the terminal voltage to the timer capacitor 213' reaches the value Vb first, turning the transistor 211' ON, and there occurs energization of the electromagnetic solenoid 212' which opens, in turn, the normally closed switch 224 of the block W. Consequently, the capacitor 226 ceases to be charged and oscillation of the meter 228 in accordance with the terminal voltage of said capacitor 226 indicates a value of the lowest brightness at this moment.

In this manner, the electromagnetic solenoid 206 of the block A is activated to detect the highest brightness and the electromagnetic solenoid 212' is activated to detect the lowest brightness so that the respectively determined values may be simultaneously indicated by the meters 221 and 228, respectively.

Figure 24:
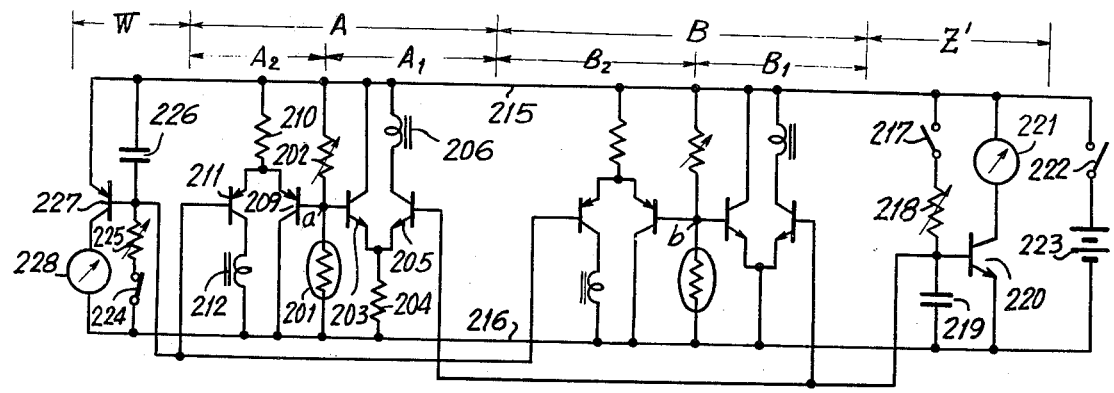

FIG. 24 shows an embodiment corresponding to a modification of the embodiment as shown by FIG. 23, wherein the timer circuits in the respective brightness detector blocks of FIG. 23 are eliminated and a particular simplification is provided so that the time circuit of the highest brightness indicator block serves also as those of the higher brightness detector blocks and the timer circuit of the lowest brightness indicator block serves also as those of the lower brightness detector blocks. The rest of the arrangement is similar to that of FIG. 23 and the parts common to those of FIG. 23 are designated by common references without description in detail thereof.

The manner in which this embodiment operates is substantially the same as the previous embodiment except that the terminal voltage of the timer capacitor 219 included in the highest brightness indicator block is applied to the higher brightness detector blocks as a whole and the terminal voltage of the timer capacitor 226 included in the lowest brightness indicator block is applied to the lower brightness detector blocks as a whole. These terminal voltages are used as the comparison voltage. Substantially as in the previous embodiment, the higher brightness detector block $A_1$ of the block A which is applied with the highest brightness input and the lower brightness detector block $B_2$ of the block B which is applied with the lowest brightness input are activated at their respective electromagnetic solenoids before all the other corresponding solenoids to control the brightness indicator blocks Z' and W, respectively, so that the highest brightness and the lowest brightness are simultaneously indicated. This embodiment is more advantageous in practive than the embodiment of FIG. 23 in that the arrangement may be simplified and the parts to be adjusted may be effectively reduced.

As previously mentioned in connection with the embodiment of FIG. 21, the arrangement of the CdS and the associated variable resistances serially connected thereto in FIG. 23 and FIG. 24 may be reversed in an upside down manner with respect to each other. More specifically, the higher brightness detector blocks may be replaced by the lower brightness detector blocks while the lower brightness detector blocks may be replaced by the higher brightness detector blocks and such a replacement may occur with respect to the brightness indicator blocks also.

Figure 25:
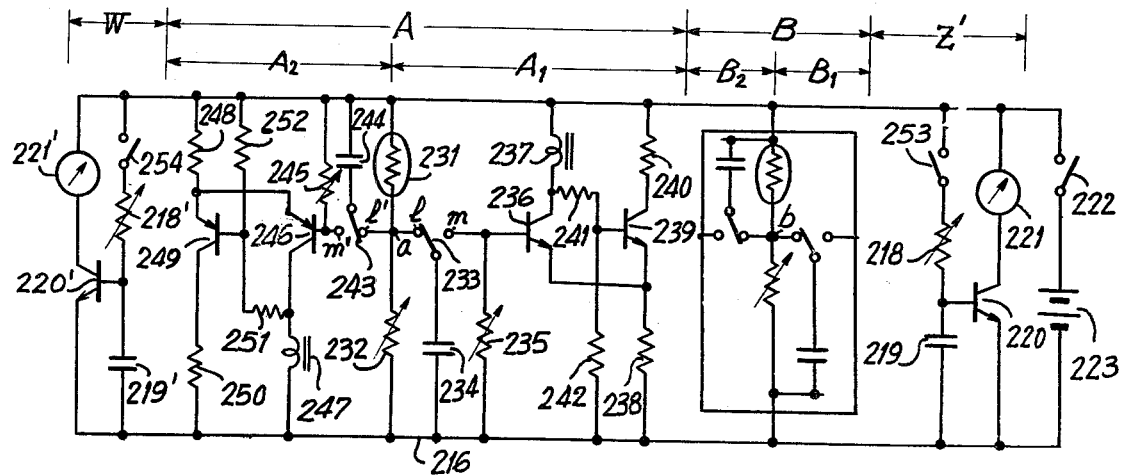

FIG. 25 shows an embodiment corresponding to the arrangement as illustrated by FIG. 22, wherein variation in the terminal voltage of the timer capacitor due to discharge thereof is utilized for the desired detection. In the block $A_1$ included in the block A, a CdS 231 and a variable resistance 232 are serially connected between the positive bus 215 and the negative bus 216, the point $a$ of this serial connection being connected to a normally closed contact $l$ of a change-over switch 233 of interlocking type of which the movable blade is connected through a timer capacitor 234 to the negative bus 216 and the normally opened contact $m$ is connected to a variable resistance 235 for timing and to the base of a transistor 236. The other terminal of variable resistance 235 is connected to the negative bus 216. The collector of transistor 236 is connected through an electromagnetic solenoid 237, adapted to control operation of a switch 253 of the block Z', to the positive bus 215. The emitter of transistor 236 is connected to a resistance 238 and to the emitter of a transistor 239, the other terminal of resistance 238 being connected to the negative bus 216. The collector of transistor 239 is connected through a resistance 240 to the positive bus 215 so that said transistors 236 and 239 constitute a Schmitt circuit.

In the block $A_2$ of the block A, point $a$ is connected to a normally closed contact $l'$ of a change-over switch 243 of interlocking type of which the movable blade is connected through a timer capacitor 244 to the positive bus 215 and the normally opened contact $m'$ is connected to a variable resistance 245 for timing and to the base of a transistor 246. The other terminal of variable resistance 245 is connected to the positive bus 215. The collector of transistor 246 is connected through an electromagnetic solenoid 247, adapted to control operation of a switch 254 of the block W, to the negative bus 216, the emitter of said transistor 246 being connected to a resistance 248 and to the emitter of a transistor 249. The other terminal of said resistance 248 is connected to the positive bus 215, and the collector of transistor 249 is connected through a resistance 250 to the negative bus 216 so that said transistors 246 and 249 constitute a Schmitt circuit. The block B has the same arrangement as the block A, but is only partially illustrated. In the block Z', a normally opened switch 253, adapted to be closed by energizing of the electromagnetic solenoid 237 included in the block $A_1$ or the corresponding electromagnetic solenoid included in the block $B_1$, a variable resistance 218 and a timer capacitor 219 are serially connected between the positive bus 215 and the negative bus 216, and the rest of arrangement is in accordance with the previous embodiment. Finally in the block W, a normally open switch 254, adapted to be closed by energizing of the electromagnetic solenoid 247 included in the block $A_2$ or the corresponding electromagnetic solenoid included in the block $B_2$, a variable resistance 218' for timing and a timer capacitor 219' are serially connected between the positive bus 215 and the negative bus 216, and the rest of arrangement is in accordance with the block Z.

The manner in which the embodiment of FIG. 25 operates will be now described with respect to a case in which it is assumed that the block A receives the highest brightness input. Upon closure of the source switch 222, a divided voltage Va appears at the point $a$. This voltage takes the highest value relative to the other detector blocks, since inner resistance of the CdS 231 takes the lowest value relative to those of the other CdS elements, and corresponds to the lowest terminal voltage of the CdS 231. Accordingly, the timer capacitors 234 and 244 which receive this divided voltage are to be charged to the highest and lowest potential, respectively.

When the interlocking change-over switches 233 and 243 are simultaneously changed over from the contacts $l$, $l'$ to the contacts $m$, $m'$, respectively, the Schmitt circuits of the respective blocks are simultaneously reversed. Thus, the transistors 236, 246 which have been in the OFF-state are now turned ON and the electromagnetic solenoids 237, 247 are energized to close the switches 253, 254 of the blocks Z' and W, respectively, at the same moment, so that the timer capacitors 219, 219' begin to be charged and the pointers of the meters 221, 221', respectively, begin to swing.

At the same time, the timer capacitors 234, 244 begin to be discharged through the variable resistances 235, 245, respectively, and the terminal voltage of these capacitors accordingly begins to fall gradually. Now, in the block $A_1$, the terminal voltage of the capacitor 234 is at a level higher than in any other detector block so that the electromagnetic solenoid 237 holds the switch 253 of the block Z' closed, and the Schmitt circuit of block $A_1$ is the last to be reversed, causing the electromagnetic solenoid 237 to be deenergized. As a result, the switch 253 is opened and the meter 221 indicates a particular value of the highest brightness at this moment. In this case, the terminal voltage of the capacitor 244 included in the block $A_2$ is too low and discharged too early to bring about any noticeable influence upon detection of the lowest brightness.

Assuming that the block B is applied with the lowest brightness input, a divided voltage appearing at the point $b$ corresponding to the point $a$ takes the lowest value with respect to those in the other detector blocks since the inner resistance of the CdS in this block B takes the highest value relative to those included in the other blocks. The divided voltage appearing at the point $b$ would be also the highest one as the terminal voltage of the CdS. The terminal voltage of the timer capacitor of the block $B_2$, to which said divided voltage is applied, accordingly takes the highest value, so that the Schmitt circuit thereof is the last to be reversed of the lower brightness detector blocks and the electromagnetic solenoid of this block $B_2$ is deenergized last, whereupon the switch 254 of the block W is opened and the meter 221' indicates a particular value of the lowest brightness at this moment. In this case, the timer capacitor of the block $B_1$ has a terminal voltage so low as to be completely discharged in a short time and never influences the highest brightness detection.

Figure 26:
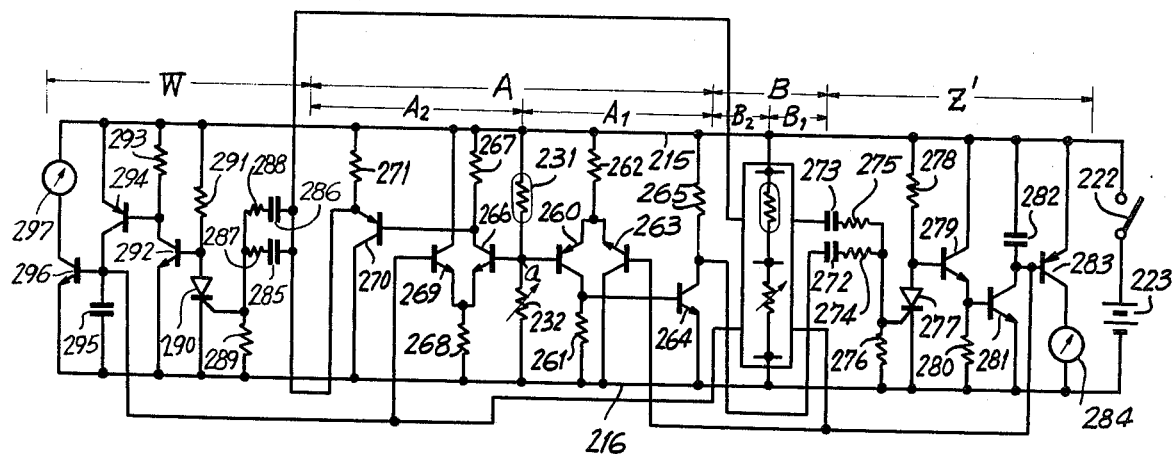

FIG. 26 shows an embodiment corresponding to the embodiment of FIG. 24 in which the mechanical control of switching is entirely electronic. In the block $A_1$ of the general block A, the junction point $a$ between the serial connection of the CdS 231 and the variable resistance 232 is connected to the base of a transistor 260 of which the collector is connected to a resistance 261 and to the base of a transistor 264. The emitter of transistor 260 is connected to a resistacne 262 and to the emitter of a transistor 263. The collector of transistor 263, the other terminal of said resistance 261 and the emitter of said transistor 264 are connected to the negative bus 216, and the other terminal of resistance 262 is connected to the positive bus 215, transistors 260 and 263 being arranged to constitute a differential amplifier. The base of said transistor 263 is connected to one terminal of a timer capacitor 282 in the block Z', and the collector of said transistor 264 is connected to one terminal of a differentiator capacitor 272 in the block Z'.

In the block $A_2$, point $a$ is connected to the base of a transistor 266 of which the collector is connected to a resistance 267 and to the base of a transistor 270. The emitter of transistor 266 is connected to a resistance 268 and to the emitter of a transistor 269. The collector of transistor 269 and the other terminal of resistance 267 are connected to the positive bus 215. The other terminal of said resistance 268 and the collector of said transistor 270 are connected to the negative bus 216. The emitter of said transistor 270 is connected through a resistance 271 to the positive bus 215. Transistors 266 and 269 are arranged to constitute a differential amplifier. The base of said transistor 269 is connected to one terminal of a timer capacitor 295 in the block W, and the emitter of said transistor 270 is connected to one terminal of a differentiator capacitor 285 in the block W. The general block B is the same as general block A.

In the block Z', buffer resistances 274, 275 are connected to the other terminals of the differentiator capacitors 272, 273 adapted to be applied with signals from the blocks $A_1$ and $B_1$, respectively, the other terminals of resistances 274, 275 being connected together to a resistance 276 and the gate of a thyristor 277. The other terminal of said resistance 276 and the cathode of said thyristor 277 are connected to the negative bus 216. The anode of said thyristor 277 is connected to a resistance 278 and to the base of a transistor 279. The other terminal of said resistance 278 and the collector of said transistor 279 are connected to the positive bus 215. The emitter of transistor 279 is connected to a resistance 280 and the base of a current control transistor 281. The other terminal of resistance 280 and the emitter of transistor 281 are connected to the negative bus 216. The collector of transistor 281 is connected to a timer capacitor 282 and the base of a transistor 283. The other terminal of capacitor 282 and the emitter of said transistor 283 are connected to the positive bus 215. The collector of said transistor 283 is connected through a meter 284 to the negative bus. The junction point between transistor 281 and capacitor 282 is connected to the base of the transistor 263 of the block $A_1$ and to the base of the corresponding transistor of the block $B_1$, this latter connection being shown schematically.

In the block W, buffer resistances 287 and 288 are connected to the other terminals of differentiator capacitors 285 and 286, adapted to be applied with signals provided from the blocks $A_2$ and $B_2$, respectively. The other terminals of resistances 287 and 288 are together connected to a resistance 289 and to the gate of a thyristor 290. The other terminal of resistance 289 and the cathode of thyristor 290 are connected to the negative bus 216. The anode of thyristor 290 is connected to a resistance 291 and to the base of a transistor 292. The other terminal of resistance 291 is connected to the positive bus 215. The emitter of transistor 292 is connected to the negative bus 216. The collector of transistor 292 is connected to a resistance 293 to the base of a current control transistor 294. The other terminal of said resistance 293 and the emitter of transistor 294 are connected to the positive bus 215. The collector of transistor 294 is connected to a timer capacitor 295 and to the base of a transistor 296. The other terminal of capacitor 295 and the emitter of transistor 296 are connected to the negative bus 216. The collector of transistor 296 is connected through a meter 297 to the positive bus 215, and the connection point of transistor 294 and capacitor 295 is connected to the base of the transistor 269 in the block $A_2$ and to the base of the corresponding transistor in the block $B_2$, as schematically illustrated.

The manner in which the embodiment of FIG. 26 operates will now be described. Upon closure of the source switch 222, a divided voltage appears on the point $a$ in the general block A and, upon application of this voltage, the transistors 260 and 266 are initially turned ON, while the transistors 263 and 269 are in the OFF-state and the transistors 264 and 270 are in ON-state. The general block B operates then in the same way as the general block A.

In the blocks Z' and W, consequently, all of the respective input terminals of the capacitors 272, 273, 285 and 286 are grounded and, as a result, no signal is applied to the gates of the thyristors 277 and 290 which are accordingly in the OFF-state. Thus, the transistors 279 and 292 are turned ON and then the transistors 281 and 294 are also turned ON. The timer capacitors 282 and 295 now begin to be charged and the meters 284 and 297 begin to oscillate in accordance with rises in the terminal voltages of capacitors 282 and 295, respectively. The terminal voltage of the timer capacitor 282 is applied to the bases of the second or following transistors of the associated differential amplifiers in the blocks $A_1$ and $B_1$ and the terminal voltage of the timer capacitor 295 is applied to the bases of the second or following transistors of the respective differential amplifiers in the blocks $A_2$ and $B_2$ as the comparison voltages, respectively.

Assuming that the general block A receives the highest brightness input, the terminal voltage of the CdS 231 would take the lowest value with respect to those of the other blocks. As a result, the transistor 263 of the block $A_1$ is turned ON earlier than any one of the corresponding transistors in the other higher brightness detector blocks, turning the transistor 260 OFF. The transistor 264 is thereby turned OFF and the differentiator capacitor 272 is brought off from its grounded state. Voltage now appearing on the input terminal of capacitor 272 strikes the gate of the thyristor 277 so as to turn thyristor 277 ON, then to turn the transistor 279 OFF and to turn also the transistor 281 OFF, whereupon the capacitor 282 ceases to be charged and the meter 284 indicates a particular value of the highest brightness at this moment.

Now assuming that the general block A receives the lowest brightness input, the divided voltage appearing at the point $a$ would take the lowest value relative to those in the other blocks, so that the differential amplifier included in the block $A_2$ is earliest reversed again just as in the previous case. As a result, the block W operates in the same manner as the block Z, namely, the capacitor 295 ceases to be charged and the meter 297 indicates a particular value of the lowest brightness at this moment.

This embodiment provides a further improved convenience in that the control mechanism is entirely electronic, and no mechanical components are left.

Figure 27:
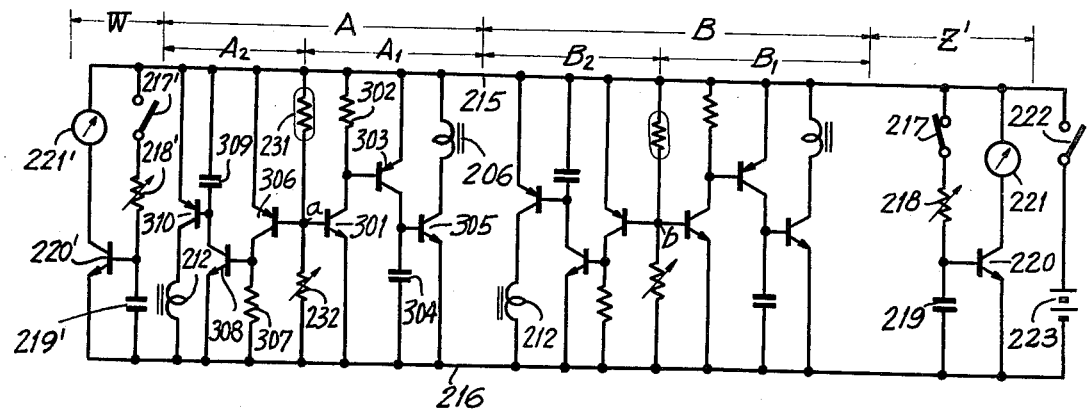

Finally referring to FIG. 27 which shows an embodiment based on the arrangement as illustrated by FIG. 22, information on the brightness supplied through the CdS is directly applied to each timer circuit and the highest and lowest brightnesses are detected according to the differences among the individual timer circuits with respect to their rates of charge.

In the block $A_1$ included in the general block A, the point $a$ of the serial connection between the CdS 231 and the variable resistance 232 is connected to the base of a transistor 301 of which the emitter is connected to the negative bus 216 and the collector is connected to a resistance 302 and to the base of a current control transistor 303. The other terminal of resistance 302 and the emitter of transistor 303 are connected to the positive bus 215. The collector of transistor 303 is connected to a timer capacitor 304 and to the base of said transistor 305. The other terminal of capacitor 304 and the emitter of said transistor 305 are connected to the negative bus 216. The collector of transistor 305 is connected through the electromagnetic solenoid 206, adapted to open the switch 217 of the block Z', to the positive bus 215.

In the block $A_2$ point $a$ is connected to the base of a transistor 306 of which the emitter is connected to the positive bus 215 and the collector is connected to a resistance 307 and to the base of a current control transistor 308. The other terminal of resistance 307 and the emitter of said transistor 308 are connected to the negative bus 216. The collector of transistor 308 is connected to a timer capacitor 309 and to the base of a transistor 310. The other terminal of capacitor 309 and the emitter of transistor 310 are connected to the positive bus 215. The collector of transistor 310 is connected through the electromagnetic solenoid 212, adapted to open the switch 217' of the block W, to the negative bus 216. The general block B is arranged the same as the general block A and the blocks Z' and W are of the same arrangement as the block Z.

The manner in which this embodiment operates will be now described, on the assumption that the general block A receives the highest brightness input while the general block B receives the lowest brightness input. Upon closure of the source switch 222, the timer capacitors 219 and 219' in the blocks Z' and W, respectively, begin to be charged, whereupon the divided voltages V$a$, V$b$ ... appear at the point $a$ of the general block A, at the point $b$ of the general block B ..., etc. Of these divided voltages, V$a$ takes the highest value and V$b$ takes the lowest value. Consequently, the conductivity of the transistor 301 in the block $A_1$ is the highest as compared to the other higher brightness detector blocks and the current control transistor 303 which is applied with a signal from transistor 301 has the lowest inner resistance compared to the other higher brightness detector blocks. The terminal voltage of the timer capacitor 304 accordingly is the first to rise and the transistor 305 is the earliest in response thereto to activate the electromagnetic solenoid 206 under control of which the normally closed switch 217 of the block Z' is opened and the meter 221 indicates the highest brightness value at this moment.

In the general block B, on the other hand, V$b$ takes the lowest value compared to the other corresponding values as previously mentioned but the same V$b$ corresponds to the highest value as the terminal voltage of the CdS, so that the electromagnetic solenoid 212 of the block $B_2$ which is applied with this voltage is earliest activated, compared to those of the other lower brightness detector blocks, opening the normally closed switch 217' of the block W and thereby causing the meter 221' to indicate a particular lowest brightness value at this moment.

This embodiment is advantageous in that the circuit arrangement may be simplified and the manufacturing cost may be reduced since no differential amplifier and no Schmitt circuit are employed therein.

It will be understood from the aforementioned embodiments that the present invention provides a device for simultaneous detection of the highest and the lowest brightness of an object to be photographed utilizing common photosensitive elements arranged for detection of partial brightness of the object. This device according to the present invention, compared to devices in which a pair of photosensitive elements comprising the one for the higher brightness and the other for the lower brightness are associated with a spot, is advantageous in that the number of these photosensitive elements may be reduced by half and in that the arrangement may be simplified and thereby the cost may be effectively reduced.

What is claimed is:

1. In a light-responsive system, a plurality of photosensitive means for respectively providing electrical inputs when light is received by said plurality of photosensitive input means, with said inputs respectively having magnitudes determined by the brightness of the light received by said plurality of photosensitive input means, support means supporting said plurality of photosensitive input means respectively in positions for receiving light from different parts of a scene so that when the scene has a condition of non-uniform brightness the magnitudes of said inputs will vary with a pair of said photosensitive input means respectively providing inputs of maximum and minimum magnitude, electrical output means for providing a given output, and a plurality of electrical circuit means respectively connected electrically with said plurality of photosensitive input means for respectively producing given signals in a sequence determined by said magnitudes and all connected electrically with said output means for providing at the latter an output determined by the signal produced by the electrical circuit means connected to at least one of said pair of photosensitive input means.

2. The combination of claim 1 and wherein said plurality of electrical circuit means operate said electrical output means to provide an output corresponding to that part of said scene which has the maximum brightness.

3. The combination of claim 1 and wherein said plurality of electrical circuit means operates said electrical output means to provide an output corresponding to that part of the scene which has minimum brightness.

4. The combination of claim 1 and including a pair of said electrical output means electrically connected through said plurality of electrical circuit means with said plurality of photosensitive input means for respectively providing a pair of outputs one of which corresponds to that part of the scene which has maximum brightness and the other of which corresponds to that part of the scene which has minimum brightness.

5. The combination of claim 4 and wherein said plurality of photosensitive input means are arranged in pairs for respectively responding to maximum and minimum brightness and are electrically connected respectively with said plurality of electrical circuit means.

6. The combination of claim 4 and wherein said plurality of electrical circuit means form pairs of electrical circuit means with the two electrical circuit means of each pair being respectively connected with said pair of output means, and a single photosensitive input means electrically connected with each pair of electrical circuit means.

7. The combination of claim 1 and wherein said output means includes a switch movable between open and closed positions, and said plurality of electrical circuit means being electrically connected with said switch for moving the latter from one to the other of said positions for providing said output.

8. The combination of claim 7 and wherein said plurality of electrical circuit means respectively include a plurality of solenoids which respectively cooperate with said switch for displaying the latter from said one to said other position.

9. The combination of claim 8 and wherein said plurality of electrical circuit means include capacitors which become charged for actuating said solenoids.

10. The combination of claim 8 and wherein said plurality of electrical circuit means include capacitors which become discharged for actuating said solenoids.

11. The combination of claim 1 and wherein said plurality of electrical circuit means are fully electronic with said output means including an electronic switching means which transfers between an OFF state and an ON state for actuating said output means.

12. The combination of claim 11 and wherein said electronic circuit means include capacitors which become charged for actuating said electronic switch means.

13. The combination of claim 11 and wherein said electronic electrical circuit means include capacitors which become discharged for actuating said electronic switch means.

14. The combination of claim 1 and wherein said plurality of electrical circuit means each include a differential amplifier means for comparing an input with a given electrical quantity to determine operation of said output means.

15. The combination of claim 1 and wherein said plurality of electrical circuit means include a plurality of timing circuits and said output means including a timing circuit operated by the timing circuits of said plurality of electrical circuit means.

16. The combination of claim 1 and wherein said output means includes a meter for indicating a value corresponding to the magnitude of the input provided by said one of said pair of photosensitive input means.

17. The combination of claim 1 and wherein said plurality of photosensitive input means each include a cadmium sulfide resistor for providing a resistance value which is inversely proportional to the brightness of the light received by each resistor.

18. In a light-responsive system, a plurality of photosensitive input means for respectively providing electrical inputs when light is received by said plurality of photosensitive input means, with said inputs respectively having magnitudes determined by the brightness of the light received by said plurality of photosensitive input means, support means supporting said plurality of photosensitive input means respectively in positions for receiving light from different parts of a scene so that when the scene has a condition of non-uniform brightness the magnitudes of said inputs will vary with a pair of said photosensitive input means respectively providing inputs of maximum and minimum magnitude, electrical output means for providing a given output, and a plurality of electrical circuit means respectively connected electrically with said plurality of photosensitive means and all connected electrically with said output means for providing at the latter an output determined by at least of said pair of photosensitive input means, said plurality of electrical circuit means and said output means including a single timing circuit which is common to said plurality of electrical circuit means and said output means.

* * * * *